(12) United States Patent
Yamada et al.

(10) Patent No.: US 10,277,812 B2
(45) Date of Patent: Apr. 30, 2019

(54) IMAGE PROCESSING TO OBTAIN HIGH-QUALITY LOOP MOVING IMAGE

(71) Applicant: SONY CORPORATION, Tokyo (JP)

(72) Inventors: Hideshi Yamada, Kanagawa (JP); Mitsuharu Ohki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/168,445

(22) Filed: May 31, 2016

(65) Prior Publication Data

US 2016/0277677 A1 Sep. 22, 2016

Related U.S. Application Data

(63) Continuation of application No. 13/696,711, filed as application No. PCT/JP2012/056080 on Mar. 9, 2012, now Pat. No. 9,390,535.

(30) Foreign Application Priority Data

Mar. 18, 2011 (JP) ................................. 2011-060651

(51) Int. Cl.
*H04N 5/232* (2006.01)
*G06T 13/80* (2011.01)

(52) U.S. Cl.
CPC ......... *H04N 5/23232* (2013.01); *G06T 13/80* (2013.01); *H04N 5/23245* (2013.01); *H04N 5/23254* (2013.01); *H04N 5/23267* (2013.01)

(58) Field of Classification Search
CPC ................................. G06T 7/20; G06T 7/2006
(Continued)

(56) References Cited

U.S. PATENT DOCUMENTS 5,404,316 A 4/1995 Klingler et al.
5,607,356 A 3/1997 Schwartz
(Continued)

FOREIGN PATENT DOCUMENTS

CN 1949271 A 4/2007
CN 101606384 A 12/2009
(Continued)

OTHER PUBLICATIONS

Office Action for EP Patent Application No. 12760064.1, dated Sep. 13, 2016, pp. 04.
(Continued)

*Primary Examiner* — Hung Q Dang
(74) *Attorney, Agent, or Firm* — Chip Law Group

(57) ABSTRACT

The present technology relates to an image processing device and method, and program, whereby a high-quality loop moving image can be obtained more easily. Upon continuous shot images of multiple frames serving as material of a loop moving image being input, the continuous shot images are divided into multiple segments including motion segments including a moving subject and a still segment including a subject with no motion. An image of the motion segment region of the continuous shot images is formed into a loop moving image, and a segment loop moving image is generated. Also, an image of a still segment region of the continuous shot images is clipped out, and a segment image which is a still image is generated. Further, these segment loop moving image and segment image are integrated, to form one loop moving image. The present invention can be applied to an image processing device.

13 Claims, 13 Drawing Sheets

(58) Field of Classification Search
USPC .................................................. 386/278–290
See application file for complete search history.

(56) References Cited

U.S. PATENT DOCUMENTS

| | | | |
|---|---|---|---|
| 5,752,160 A | 5/1998 | Dunn | |
| 6,466,701 B1* | 10/2002 | Ejiri | H04N 5/23238 |
| | | | 348/135 |
| 6,636,220 B1* | 10/2003 | Szeliski | G06T 13/80 |
| | | | 345/475 |
| 2001/0004739 A1 | 6/2001 | Sekiguchi et al. | |
| 2002/0135699 A1 | 9/2002 | Jacobs | |
| 2007/0263126 A1* | 11/2007 | Chao | H04N 5/144 |
| | | | 348/607 |
| 2008/0133521 A1* | 6/2008 | Podilchuk | G06F 17/30247 |
| 2008/0273037 A1 | 11/2008 | Girard | |
| 2008/0292189 A1 | 11/2008 | Morimoto et al. | |
| 2009/0060348 A1* | 3/2009 | Monro | G06K 9/00617 |
| | | | 382/209 |
| 2009/0080853 A1* | 3/2009 | Chen | G06F 17/30787 |
| | | | 386/241 |
| 2010/0194869 A1* | 8/2010 | Matsuzaki | G06T 7/254 |
| | | | 348/65 |
| 2011/0002541 A1 | 1/2011 | Varekamp | |
| 2011/0038612 A1* | 2/2011 | Joffe | G11B 20/00086 |
| | | | 386/290 |
| 2011/0222787 A1* | 9/2011 | Thiemert | G06F 17/30802 |
| | | | 382/225 |
| 2012/0062748 A1* | 3/2012 | Ofek | G06K 9/00771 |
| | | | 348/149 |

FOREIGN PATENT DOCUMENTS

| | | |
|---|---|---|
| CN | 101841654 A | 9/2010 |
| JP | 2001-167095 A | 6/2001 |
| JP | 2006-130148 A | 5/2006 |
| JP | 2008-149113 A | 7/2008 |
| WO | 2009/083854 A | 7/2009 |

OTHER PUBLICATIONS

Schödl, et al.,"Video Textures", pp. 10.
Schodl et al., "Video Textures", Proceedings of SIGGRAPH 2000, Jul. 2000, pp. 489-498.
European Search Report received for European Patent Application No. 12760064.1, dated Jul. 2, 2014, 6 pages.
Koprinska, et al: "Temporal Video Segmentation: A Survey", Signal Processing: Image Communication, Elsevier Science, vol. 16, 2001, pp. 477-500.
Summons to Attend Oral Proceedings issued in EP Application No. 12760064.1 on May 11, 2017, 5 pages.
Office Action for CN Patent Application No. 201610371071.1, dated Jun. 27, 2018, 07 pages of Office Action and 10 pages of English Translation.
Office Action for CN Patent Application No. 201610371071.1, dated Jan. 14, 2019, 8 pages of Office Action and 12 pages of English Translation.

* cited by examiner

IMAGE PROCESSING TO OBTAIN HIGH-QUALITY LOOP MOVING IMAGE

CROSS REFERENCE TO RELATED APPLICATIONS

The present application is a continuation application of U.S. patent application Ser. No. 13/696,711, filed Nov. 7, 2012, which is a National Stage of PCT/JP2012/056080, filed Mar. 9, 2012, and claims the priority from prior Japanese Priority Patent Application JP 2011-060651 filed in the Japan Patent Office on Mar. 18, 2011, the entire content of which is hereby incorporated by reference.

TECHNICAL FIELD

The present technology relates to an image processing device and method, and program, and particularly relates to an image processing device and method, and program, whereby a high-quality loop moving image can be obtained more easily.

BACKGROUND ART

Conventionally, there is known a technology for generating an input video picture (e.g., NPL 1). A loop moving image is an image where a predetermined section of a moving image or multiple still images are repeatedly played.

For example, when generating a loop moving image, a predetermined section of a moving image is processed such that the seam due to difference in images between frames is inconspicuous to the eye even in the event that the frame at the starting edge of a predetermined section of the moving image and the ending edge thereof are not temporally continuous.

Accordingly, repeatedly playing the loop moving image results in the starting edge of the moving image and the ending edge thereof becoming unclear, so the viewer will have a sensation of being presented with an endless moving image. Loop moving images are effecting in various application programs, such as texture material and background moving images in CG (Computer Graphics), and so forth.

Such a loop moving image is basically generated as follows. First, two frames which are temporally distant but with a high degree of similarity, and these frames are used as the starting edge and ending edge, thereby forming a loop moving image.

Now, at the time of playing the loop moving image, the ending edge and starting edge of the section extracted from the moving image are played continuously. Accordingly, the more similar the frames of the starting edge and ending edge of the section of the moving image used as the loop moving image are, the more smoothly these frame images can be linked at the time of playing the loop moving image. For example, in order to make linking of the starting edge and ending edge of the section of moving image taken as the loop moving image more smooth, cross-fading processing is performed where the frames at and near the starting edge and ending edge of the moving image are blended to obtain frame images of the loop moving image.

CITATION LIST

Non Patent Literature

NPL 1: Arno Schodl, Richard Szeliski, David H. Salesin, and Irfan Essa. "Video textures". Proceedings of SIGGRAPH 2000, pages 489-4 98, July 2000.

SUMMARY OF INVENTION

Technical Problem

However, depending to the video picture (moving image) serving as the material for the loop moving image, the starting edge and ending edge of the loop moving image may not connect smoothly, leading to marked failure in the processing results. Specifically, there have been cases where there is no timing (frames) with the subjects connecting smoothly at the same time, or even cases where there are no similar frames in the video picture at all.

In the event that a loop moving image is generated with such an unsuitable video picture as material, the images at the starting edge and ending edge frames of the loop moving image may fail, or the starting edge and ending edge may not be smoothly connected when playing. In such a case, the user has had to handle this so that a desired loop moving image is obtained, by shooting the material video picture again, or manually changing parameters used for generating the loop moving image.

The present technology has been made in light of such a situation, and is to enable high-quality loop moving image to be obtained more easily.

Solution to Problem

An image processing device according to a first aspect of the present technology includes: a segment calculating unit configured to, based on a plurality of shot images shot at different points in time, divide the shot images into several segments; and a loop moving image generating unit configured to clip out, from several continuous the shot images out of the plurality of shot images, images of motion segments which are the segments in which a subject with motion is included, and to generate an image playable as a loop moving image, based on the images of the motion segments.

Of the images of several continuous the motion segments, the loop moving image may be a moving image of images between two images with a high degree of similarity being repeatedly displayed in order.

The image processing device may further include a segment image generating unit configured to clip out, from several the shot images out of the plurality of shot images, an image of a still segment which is the segment including a subject with no motion, and to generate a segment image which is one still image based on the image of the still segment.

The image processing device may further include a segment integration processing unit configured to integrate images playable as the loop moving image and the segment image, thereby generating one loop moving image.

The segment image generating unit may generate the segment images by overlaying several of the still segment images.

In the event that there are two images with a high degree of similarity out of the plurality of continuous images of the motion segment, the loop moving image generating unit may generate an image playable as the loop moving image, based on the plurality of continuous images of the motion segment including the two images with a high degree of similarity.

In the event that there are no two images with a high degree of similarity out of the plurality of continuous images of the motion segment, the loop moving image generating unit may generate a segment image which is one still image based on one image of the motion segment.

The image processing device may further include a segment image generating unit configured to clip out, from a high-resolution image with higher resolution than the shot images, an image of a region corresponding to a still segment which is the segment in which a subject with no motion is included, and to generate a segment image which is one still image, based on an image in a region corresponding to the still segment; with the loop moving image generating unit generating a playable image as the loop moving image, based on the shot images converted to the same resolution as that of the high-resolution image.

The image processing device may further include an operating unit configured to switch shooting modes, wherein, in the event that a predetermined mode has been selected as the shooting mode by operating the operating unit, the shot images and the high-resolution image are shot.

The plurality of the shot images may be shot before shooting of the high-resolution image; with the image processing device further including a notifying unit configured to determine whether or not there are two images with a high degree of similarity in images of the motion segment in the plurality of the shot images, and to output the determination results thereof.

In the event that determination is made that there are the two images with a high degree of similarity, the high-resolution image may be shot, with an image playable as the loop moving image and the segment image being generated.

An image processing method or program according to the first aspect of the present technology includes the steps of: based on a plurality of shot images shot at different points in time, dividing the shot images into several segments; and clipping out, from several continuous the shot images out of the plurality of shot images, images of motion segments which are the segments in which a subject with motion is included, and generating an image playable as a loop moving image, based on the images of the motion segments.

With the first aspect of the present technology, based on a plurality of shot images shot at different points in time, the shot images are divided into several segments, images of motion segments which are the segments in which a subject with motion is included are clipped out from several continuous the shot images out of the plurality of shot images, and an image playable as a loop moving image is generated based on the images of the motion segments.

An image processing device according to a second aspect of the present technology includes: a notifying unit configured to determine whether or not there are two shot images with a high degree of similarity in a plurality of shot images shot at different points in time, and to output the determination results thereof; and a loop moving image generating unit configured to generate an image playable as a loop moving image, based on, out of the plurality of shot images, a plurality of continuous the shot images including two the shot images with a high degree of similarity.

An image processing method according to the second aspect of the present technology includes the steps of: determining whether or not there are two shot images with a high degree of similarity in a plurality of shot images shot at different points in time, and outputting the determination results thereof, and generating an image playable as a loop moving image, based on, out of the plurality of shot images, a plurality of continuous the shot images including two the shot images with a high degree of similarity.

With the second aspect of the present technology, whether or not there are two images with a high degree of similarity in a plurality of shot images shot at different points in time is determined, the determination results thereof are output, and an image playable as a loop moving image is generated, based on, out of the plurality of shot images, a plurality of continuous the shot images including two the shot images with a high degree of similarity.

Advantageous Effects of Invention

According to the first aspect and the second aspect of the present technology, a high-quality loop moving image can be obtained more easily.

DESCRIPTION OF EMBODIMENTS

Embodiments to which the present technology is applied will be described below, with reference to the drawings.
<First Embodiment>
[About Loop Moving Image Generating Technique]

Figure 1:
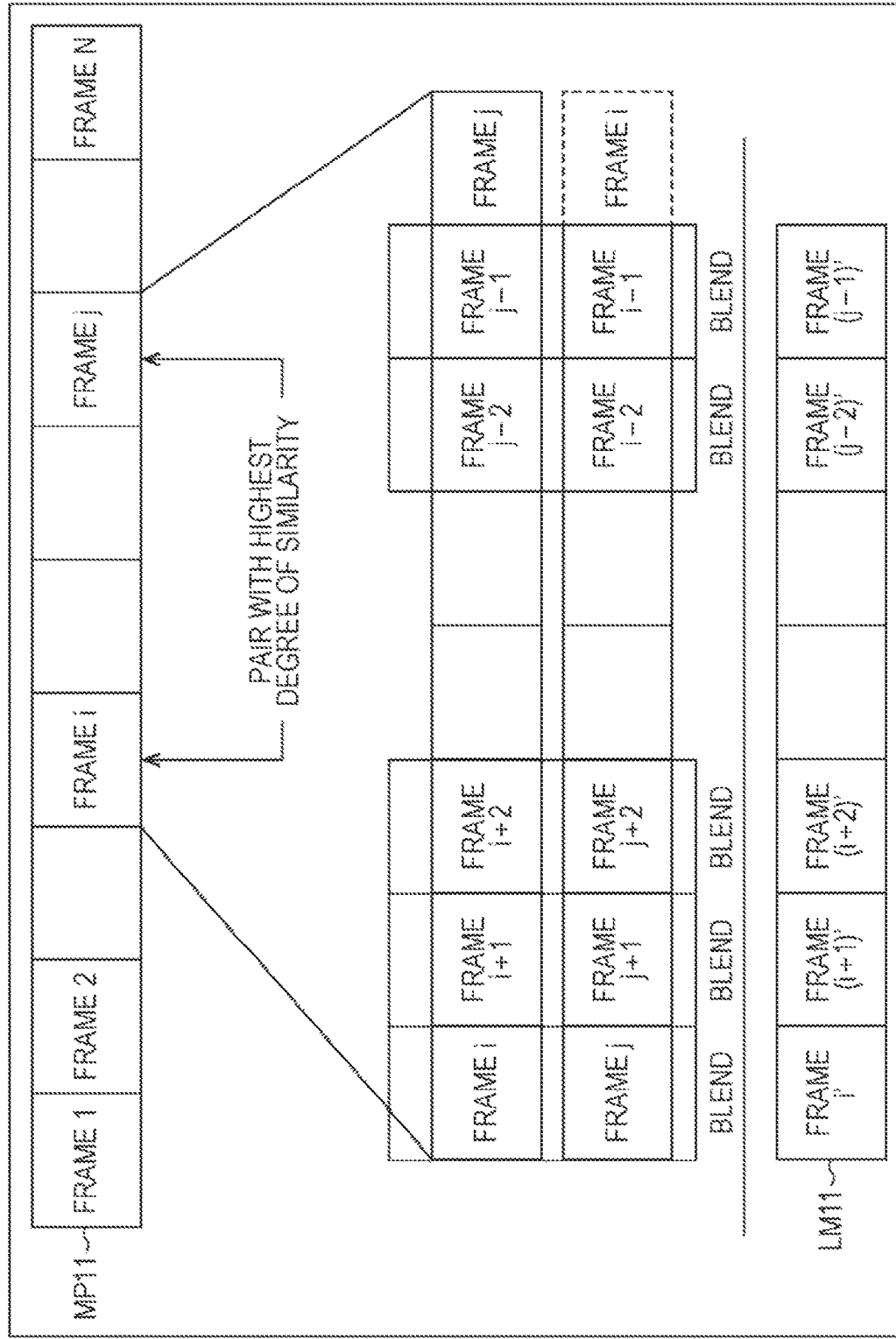
FIG. 1 is a diagram for describing generating of a loop moving image.

First, an overview of a loop moving image generating technique will be described. For example, let us consider a case of a moving image MP11 made up of multiple frames being input as material of the loop moving image, as shown in FIG. 1 for example, and a predetermined section of the moving image MP11 being clipped to generate a loop moving image. Note that in FIG. 1, the horizontal direction indicates time, and each square in the drawing represents an image of one frame.

At the time of generating a loop moving image, a pair of frames with the highest degree of similarity and situated at temporally distance positions, are detected from the moving image MP11 serving as the material. In this example, of the frames making up the moving image MP11, a frame i and a frame j which is temporally after the frame i are detected as a frame pair having the highest degree of similarity. Upon a pair of frames being detected in this way, the section from frame i through frame j of the moving image MP11 is clipped out.

Generally, even if a pair of images with high degree of similarity are detected within the moving image, the images of these frames will not completely match. Accordingly, if the section where the two detected frames serve as the starting edge and ending edge is repeatedly played, the user can clearly tell the transition (seam) from the ending edge to the starting edge.

Accordingly, the images of the frames near the starting edge of the section clipped out from the moving image MP11, and the images of the frames near the ending edge, are processed, thereby forming a loop moving image LM11.

That is to say, the image of the frame i at the starting edge of the section clipped out from the moving image MP11, and the image of the frame j at the ending edge are blended, and the image obtained as the result thereof is taken as a frame i' at the starting edge of the loop moving image LM11. That is to say, pixels at the same position in the image of frame i and the image of frame j are added with a predetermined weighting, thereby obtaining pixels of the image of the frame i' at the same position as those pixels.

Also, a frame (i+1) one after the frame i and a frame (j+1) one after the frame j are blended by a predetermined weighting, thereby obtaining a frame (i+1)' one after frame i'. Further, a frame (i+2) one after the frame (i+1) and a frame (j+2) one after the frame (j+1) are blended by a predetermined weighting, thereby obtaining a frame (j+2)' one after frame (j+1)'.

In the same way, a frame (i−1) one before the frame i and a frame (j−1) one before the frame j are blended by a predetermined weighting, thereby obtaining an ending edge frame (j−1)' of the loop moving image LM11. Also, a frame (i−2) one before the frame (i−1) and a frame (j−2) one before the frame (j−1) are blended by a predetermined weighting, thereby obtaining a frame (j−2)' one before frame (j−1)'.

Now, with the blending processing around the starting edge of the section clipped out from the moving image MP11, the farther after the starting edge the frame is, the greater the weighing multiplied as to the image of the frame at the starting edge is. That is to say, the rate of contribution of frames at the starting edge side as to the images obtained by blending is great. Inversely, with the blending processing around the ending edge of the section clipped out from the moving image MP11, the farther before the ending edge the frame is, the greater the weighing multiplied as to the image of the frame at the ending edge is.

The technique in which the weighting used for blending processing (rate of blending) is gradually changed in accordance with the position of the frames, so as to alleviate conspicuousness of the seam of the moving image is called cross-fading.

At the time of playing the loop moving image LM11 obtained by the above-described processing, playing is performed from the starting edge frame i', in the order of frame (i+1)', (i+2)', . . . . Upon the ending edge frame (j−1)' being played, this returns to frame i' again, and the frames are repeatedly played.

Thus, by performing blending processing using the frames near the starting edge and the frames near the ending edge as to the starting edge and ending edge of the section clipped out from the moving image MP11, the starting edge and ending edge of the loop moving image LM11 can be smoothly connected. That is to say, the difference between the images of the frame i and frame (j−1) at temporally distance positions in the moving image MP11 can be kept from being visually conspicuous.

Note that, of the frames making up the section clipped out from the moving image MP11, the frames around the middle, which are at positions temporally frame from the starting edge and ending edge of the this section, are used as images of frames making up the loop moving image LM11 with not change thereto.

[About Detection Method of Frame Pair Having High Degree of Similarity]

Also, at the time of generating the loop moving image, a pair of frames having the highest degree of similarity in the moving image serving as the material is detected, with detection of such a pair of frames being performed by images being compared with each other and the degree of similarity thereof being calculated, and an optimal pair being determined based on the degree of similarity obtained by calculation.

Specifically, the sum of absolute difference of the pixels of the images or the like is used as the degree of similarity between the images. That is to say, an absolute value of difference in luminance value is obtained for each of the pixels at the same position in the two images, and the sum of the absolute values of difference of the pixels is taken as the sum of absolute difference (SAD (Sum of Absolute Difference)).

The greater the similarity between images is, the smaller the sum of absolute difference is, so if a pair of frames with the smallest sum of absolute difference is used as the starting edge and ending edge of the loop moving image, the visual difference between the starting edge and ending edge of the loop moving image should be small.

However, evaluation by sum of absolute difference between two images does not take into consideration motion of a subject in the image in the temporal direction. Specifically, if there is a clock pendulum swinging to the left and right in the image, focusing on a particular frame does not allow whether the pendulum is swinging from the left side or swinging from the right side to be determined.

Accordingly, if the pair of frames to be taken as the starting edge and ending edge of the loop moving image is detected from only the sum of absolute difference of the two images, the motion of the subject may be non-continuous at the time of transitioning from the ending edge frame to the starting edge frame when playing the loop moving image.

Figure 2:
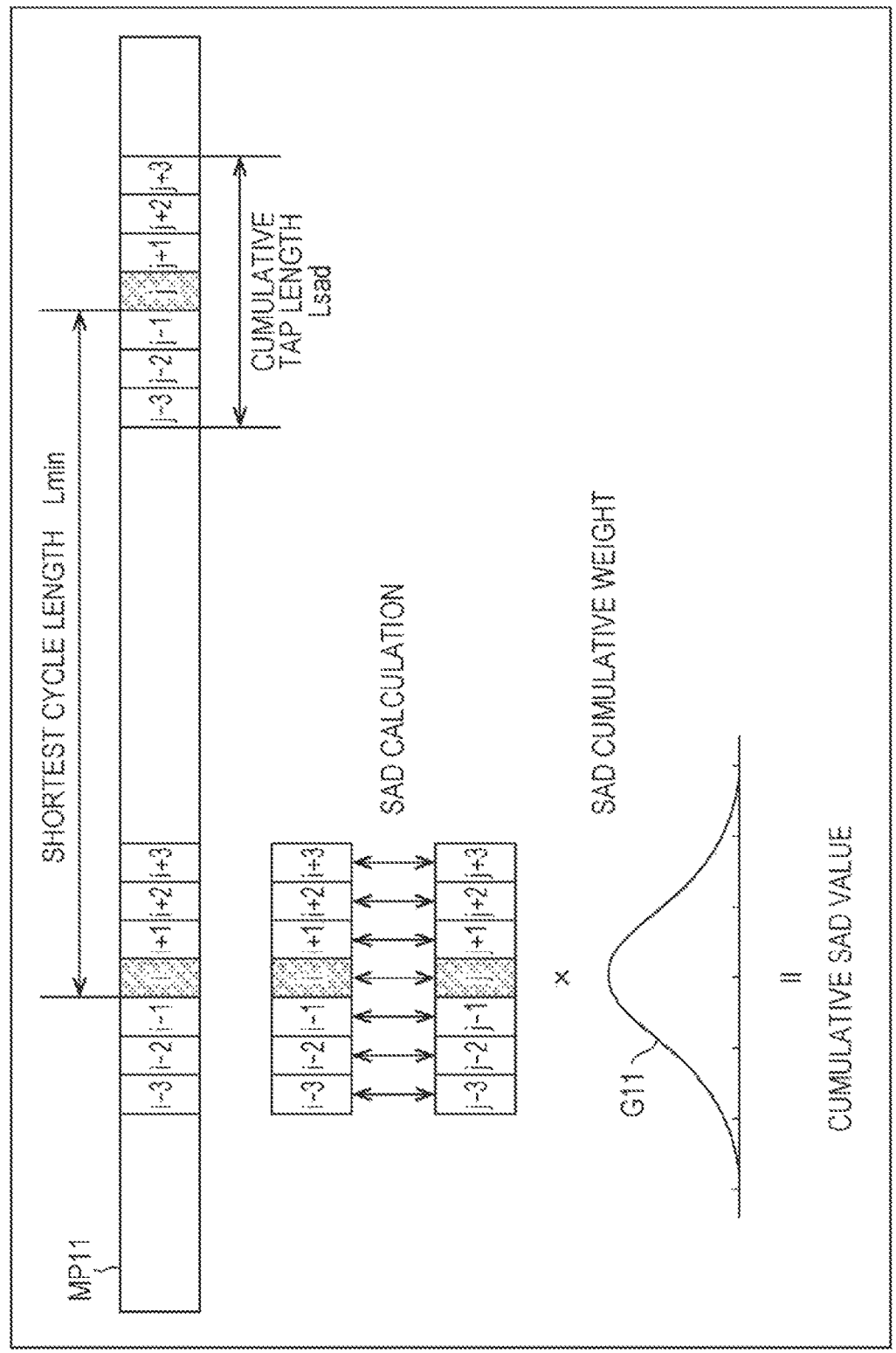
FIG. 2 is a diagram for describing comparison of similarity of images.

Accordingly, by comparing sections made up of multiple consecutive frames as shown in FIG. 2 for example, a more suitable pair of frames can be detected to be taken as the starting edge and ending edge of the loop moving image.

Note that in FIG. 2, portions corresponding to the case in FIG. 1 are denoted with the same symbols, and description thereof will be omitted as appropriate. Also, in the drawing, each square within the moving image MP11 represents one frame, and the characters within the squares are characters for identifying the frames.

For example, in the event of detecting a pair of two similar frames from the moving image MP11, whether the frame i and frame j are similar is evaluated. In this case, seven consecutive frames centered on the frame i, which are frame (i−3) through frame (i+3), and seven consecutive frames centered on the frame j, which are frame (j−3) through frame (j+3), are compared.

Specifically, as illustrated to the middle in the drawing, the sum of absolute difference (where k=−3, −2, −1, 0, 1, 2, 3) is obtained for image of the frame (i+k) and the image of the frame (j+k), the sum of absolute difference is weighted by a weighting G11, and a cumulative SAD value is obtained. That is to say, the weighting G11 is added to each sum of absolute difference and accumulated, thereby yielding a cumulative SAD value.

In the example in FIG. 2, the weighting G11 is a normal distribution weighting in which the closer to the frame i a frame is, the greater the weighting multiplied by the sum of absolute difference calculated using that frame is.

The cumulative SAD value obtained in this way is smaller the more similar the positions and motion of subjects are, when the sections of multiple consecutive frames are compared. That is to say, the higher the degree of similarity of the sections with each other is, the smaller the cumulative SAD value is. Accordingly, the pair of frames in the moving image MP11 with the smallest cumulative SAD value can be said to be the optimal pair of frames to be used for the starting edge and ending edge of the loop moving image.

Thus, the degree of similarity between sections made up of multiple continuous frames can be evaluated by obtaining a cumulative SAD value regarding multiple consecutive frames. In this case, the smaller the cumulative SAD value is, the greater the degree of similarity is.

Note that with the moving image MP11 how many consecutive frames make up sections to be compared with each other and to obtain the cumulative SAD value of these sections may be specified as a parameter with a frame length as an increment (hereinafter, also called cumulative tap length Lsad). In this case, upon the cumulative tap length Lsad being instructed by the user for example, the cumulative SAD value for a section of consecutive frames of a number indicated by the cumulative tap length Lsad is calculated.

Also, in the event of detecting a frame pair with the smallest cumulative SAD value, there is little change in images of frames which are temporally close, so the cumulative SAD value is small. Accordingly, in order to prevent loop moving images of excessively short cycles from being generated, a distance by which the compared frames (sections) have to be minimally distanced needs to be set, thereby excluding from the candidates the frame pairs with inter-frame distances shorter than this distance.

In this case, a parameter indicating the minimal distance between frames to be compared (hereinafter also called shortest cycle length Lmin) is specified by the user, for example. Thereupon, the cumulative Sad value is obtained from the pairs of frames in the moving image MP11 which are distanced by the distance indicated by shortest cycle length Lmin or more, and the frames of the pair thereof with the smallest cumulative SAD value are the starting edge and ending edge of the section used for the loop moving image.

Note that the shortest cycle length Lmin may be specified as to a program as an input parameter, or may be calculated by the program as a rate as to the entire length of the moving image MP11 serving as the material.

[About Positioning Images]

Also, at the time of generating a loop moving image, positioning of images serving as material is performed as necessary. Generally, in the event that a user shoots a video with a handheld camera, there is a high probability that the image will shake due to shaking of the hands. Such motion in camera attitude is not only unpleasant when viewing the moving image obtained by shooting, but also has adverse effects in calculating the degree of similarity between images, such as the sum of absolute difference, at the time of generating a loop moving image.

Accordingly, by performing positioning processing on the shot image, to correct camera motion such as shaking and so forth at the time of shooting, and using an image subjected to positioning processing, a loop moving image with higher quality can be obtained. That is to say, by performing positioning processing as to the image serving as the material, a moving image without any shaking can be obtained, as if the image had been shot with the camera fixed using a tripod.

With such positioning processing, one image (hereinafter called a reference image) is taken as a reference and projective transform of another image (hereinafter called image to be processed), thereby positioning the subjects in the reference image and the image to be processed. For example, a reference image may be the head frame image of the moving image serving as the material for the loop moving image, or may be an optional image.

Also, a projective transform matrix necessary for positioning is obtained by extracting feature points for each of the reference image and image to be processed, and calculating a transformation matrix such that the feature points on the image to be processed match the feature points on the reference image.

Further, we will say that feature points have reproducibility even of the point-of-view changes. That is to say, the positions and feature amounts of the feature points are calculated, the correlation between the feature points is calculated from information of the positions and feature amounts, and the positional correlation between the two frames is obtained. Examples of feature points suitable for such positioning include SIFT (Scale Invariant Feature Transform) feature points.

Next, an example of a specific calculation technique of a projective transform matrix used for the positioning processing will be described. First, feature points such as SIFT feature points are extracted from the basic image and image to be processed. Which feature points on the basic image the feature points on the image to be processed correspond to is obtained by Euclidean distance between the feature points.

Further, several feature point pairs of feature points on the image to be processed and feature points on the basic image corresponding to those feature points are selected by RANSAC (Random Sample Consensus), and a transformation matrix most suitable for transformation of the positions between the feature points making up these pairs is obtained. The transformation matrix obtained in this way is taken as the projective transform matrix used for the positioning processing. According to this RANSAC, even if there is error in the positions and correlation of the feature points, the error is eliminated and a correct transformation matrix is obtained.

Note that details of RANSAC and SIFT feature point calculation are described in, for example, "Brown, M. and Lowe, D. G. 2003. "Recognising Panoramas.", In Proceedings of the Ninth IEEE international Conference on Computer Vision-Volume 2 (Oct. 13-16, 2003). ICCV. IEEE Computer Society, Washington, D.C., 1218." and so forth.

Also, while the type of transformation matrix used for positioning processing is generally a projective transform matrix, an affine transform matrix or rigid transformation matrix or the like with differing degrees of freedom may be used.

When the image to be processed is deformed by a projective transform matrix so that the image to be processed after deformation is overlaid on the reference image, there are portions at the edges and corners of the reference image which are not overlaid with the image to be processed. Accordingly, cropping processing may be performed to leave and output only a valid region where all image pixels are overlaid when all images to be processed following projective transform are overlaid with the reference image.

That is to say, if all images to be processed which have been subjected to projective transform are overlaid with the reference image, and there is a pixel region in the images to be processed and the reference image which is not overlaid with another image, the region of such pixels is taken to be an invalid region. Then, the region of a rectangle where the area is greatest is obtained within the valid region made up from the region where all image to be processed and reference image pixels overlap, with such an invalid region excluded, and the rectangular region obtained as the result thereof is obtained as a cropped region.

Upon a cropping region being obtained in this way, the cropping region of images of the frames making up the moving image which has been subjected to projective transfer is clipped out, and the moving image made up of the images of the frames which have been clopped out are taken as the final moving image serving as the material for the loop moving image.

Note that cropping processing has a drawback in that the image following cropping becomes smaller. Accordingly, an arrangement may be made where instead of performing cropping processing, white or black color pixel values are assigned as pixel values of pixels not overlapping with the image before projective transfer, pixel values of pixels at the same position in the reference image are assigned thereto, or the like, so that the resolution of the moving image serving as the material does not deteriorate.

[About Loop Moving Image Applying Present Technology]

The above-described technology is used as appropriate for generating loop moving images. Next, a loop moving image generated by applying the present technology will be described. Note that hereinafter, an image to serve as the material for the loop moving image will be called a continuous shot image.

Figure 3:
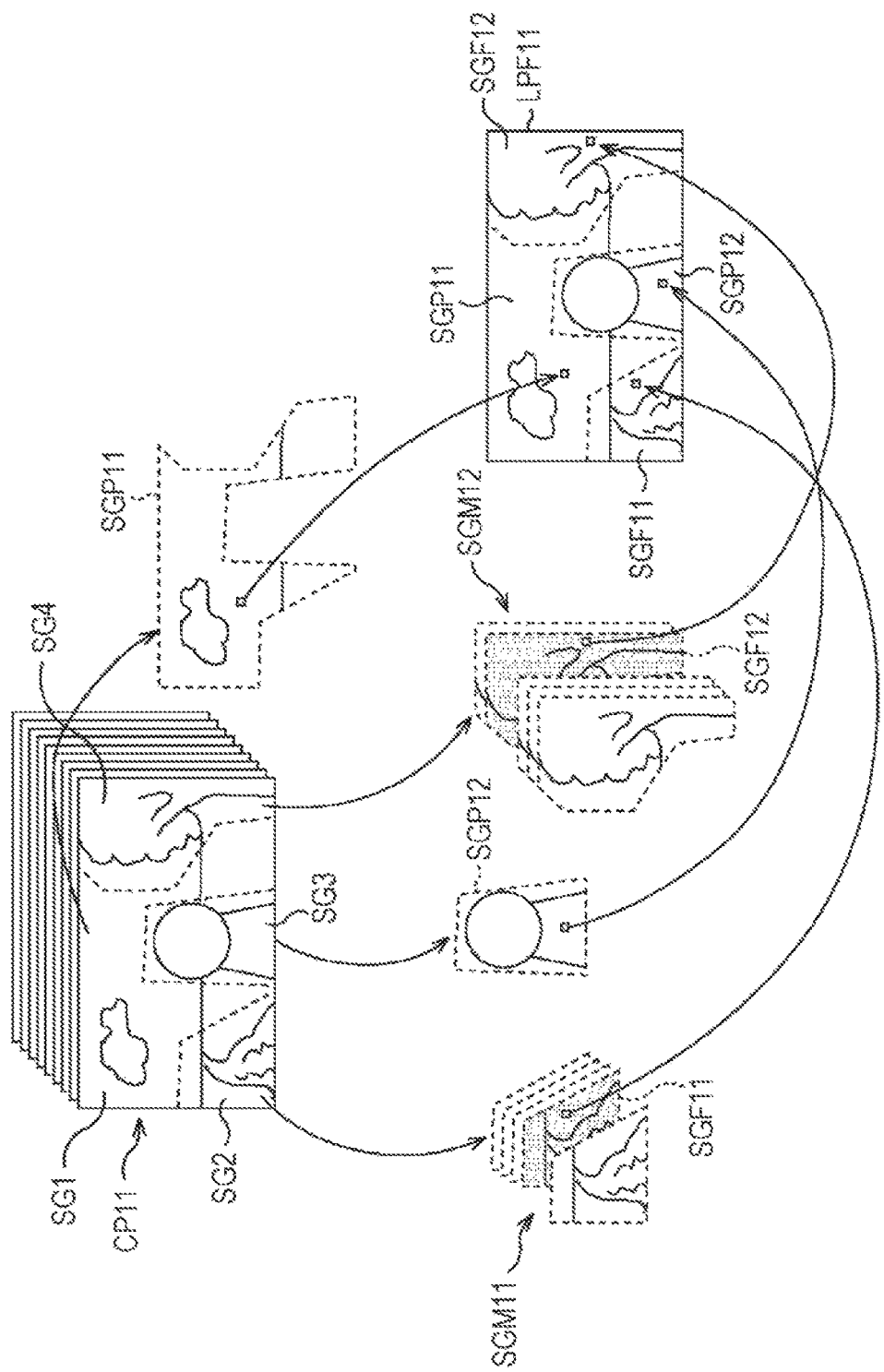
FIG. 3 is a diagram for describing generating of a loop moving image applying the present technology.

Now, we will say that a continuous shot image group CP11 made up of multiple continuous shot images has been input as material for a loop moving image as shown in FIG. 3.

Here, a continuous shot image group CP11 may be any sort of image, as long as the subject is the same and the image has been take temporally continuously. For example, the continuous shot image group CP11 may be a moving image where continuous shot images are an image of one frame, or may be a still image group made up of still images at each point in time continuously shot.

Upon such a continuous shot image group CP11 being input, the continuously shot images are divided into multiple segments made up of at least one of a segment including a subject with motion and a segment including a still subject with no motion.

In the example in FIG. 3, the continuously shot images making up the continuous shot image group CP11 are divided into four segments in the spatial direction, which are segment SG1 through segment SG4. For example, segment SG1 is a segment in which a still subject is included (hereinafter, also called still segment), and segment SG2 through segment SG4 are segments including subjects with motion (hereinafter also called motion segments).

Upon continuous shot images being divided into several segments, a still image where a region of the segment is displayed on the continuous shot images (hereinafter called segment image) or loop moving image (hereinafter called segment loop moving image) is generated for each of the segments. The segment images and segment loop moving images of the segments are integrated, to finally obtain a single loop moving image.

Specifically, first, from the segment SG1 which is the still segment, one or multiple continuous shot images are selected from the multiple continuous shot images making up the continuous shot image group CP11, thereby generating one segment image SGP11 of the selected continuous shot images. For example, the images of the segment SG1 region in the continuous shot images of the first few frames of the continuous shot image group CP11 are overlaid, thereby obtaining the segment image SGP11.

There is hardly any movement of the still subject in the still segment, so continuously displaying the segment image SGP11 which is the a still image at the time of playing the loop moving image can smooth transition of the loop moving image from the ending edge to the starting edge, without applying any particular processing to the continuous shot images.

Next, the segment SG2 which is a motion segment is judged regarding whether the images are suitable for generating a loop moving image, based on the images of the segment SG2 region on the continuous shot images making up the continuous shot image group CP11. That is to say, determination is made regarding whether or not there is a pair in the image group thereof, of images with a high degree of similarity, suitable for generating a loop moving image.

In the example in FIG. 3, the images of the segment SG2 region of the continuous shot images are determined to be suitable for generating a loop moving image, so a loop moving image is generated from these images, and obtained as a segment loop moving image SGM11 of the segment SG2.

In the same way, the segment SG3 which is a motion segment is judged regarding whether the images of the segment SG3 region on the continuous shot images making up the continuous shot image group CP11 are suitable for generating a loop moving image. In this example, the images of the segment SG3 region of the continuous shot images are determined to be unsuitable for generating a loop moving image, so one segment image SGP12 is generated from the images of the segment SG3 region of the continuous shot images making up the continuous shot image group CP11. For example, an image of the segment SG3 region in the first frame of the continuous shot images of the continuous shot image group CP11 is taken as a segment image SGP12 as it is.

The segment SG3 is a motion segment, but this segment SG3 region is unsuitable for forming a loop moving image, and a high-quality segment loop moving image cannot be obtained. Accordingly, a segment image which is a still image is generated for the segment SG3 in the same way as with the still segment, such that this segment image is continuously displayed at the time of playing the loop image, thereby preventing failure of the loop moving image.

Further, the segment SG4 which is a motion segment is judged for whether the images of the segment SG4 region on the continuous shot images making up the continuous shot image group CP11 are suitable for generating a loop moving image. In the example in FIG. 3, the images of the segment SG4 region of the continuous shot images are determined to be suitable for generating a loop moving image, so a loop moving image is generated from these images, and obtained as a segment loop moving image SGM12 of the segment SG4.

The segment image SGP11 and segment image SGP12, and segment loop moving image SGM11 and segment loop moving image SGM12, obtained regarding each segment of the continuous shot images, are integrated, obtaining a final loop moving image.

For example, an image LPF11 of a predetermined frame in the final loop moving image is obtained by integrating images of frames corresponding to the segment images or segment loop moving image images of the segments, at the same positions as with the positions of the segments.

That is to say, the image of the frame of the segment loop moving image SGM11 corresponding to the frame of the image LPF11 is the image SGF11, and the image of the frame of the segment loop moving image SGM12 corresponding to the frame of the image LPF11 is the image SGF12.

In this case, the segment image SGP11, image SGF11, segment image SGP12, and image SGF12, are each situated at the positions of segment SG1 through segment SG4 on the image LPF11, and these images are integrated to obtain the image LPF11.

Thus, by dividing the continuous shot images into several segments in accordance with motion of subjects, and forming a loop moving image by integrating the segment images and segment loop moving images generated for each segment, a high-quality loop moving image corresponding to the content of the continuous shot images can be easily obtained. With the loop moving image thus obtained, portions of still subjects can be presented like a photograph in a completely still manner with higher image quality, while emphasizing motion of portions with motion, such that it seems that a portion of a photograph is moving.

[Configuration Example of Image Processing Device]

Figure 4:
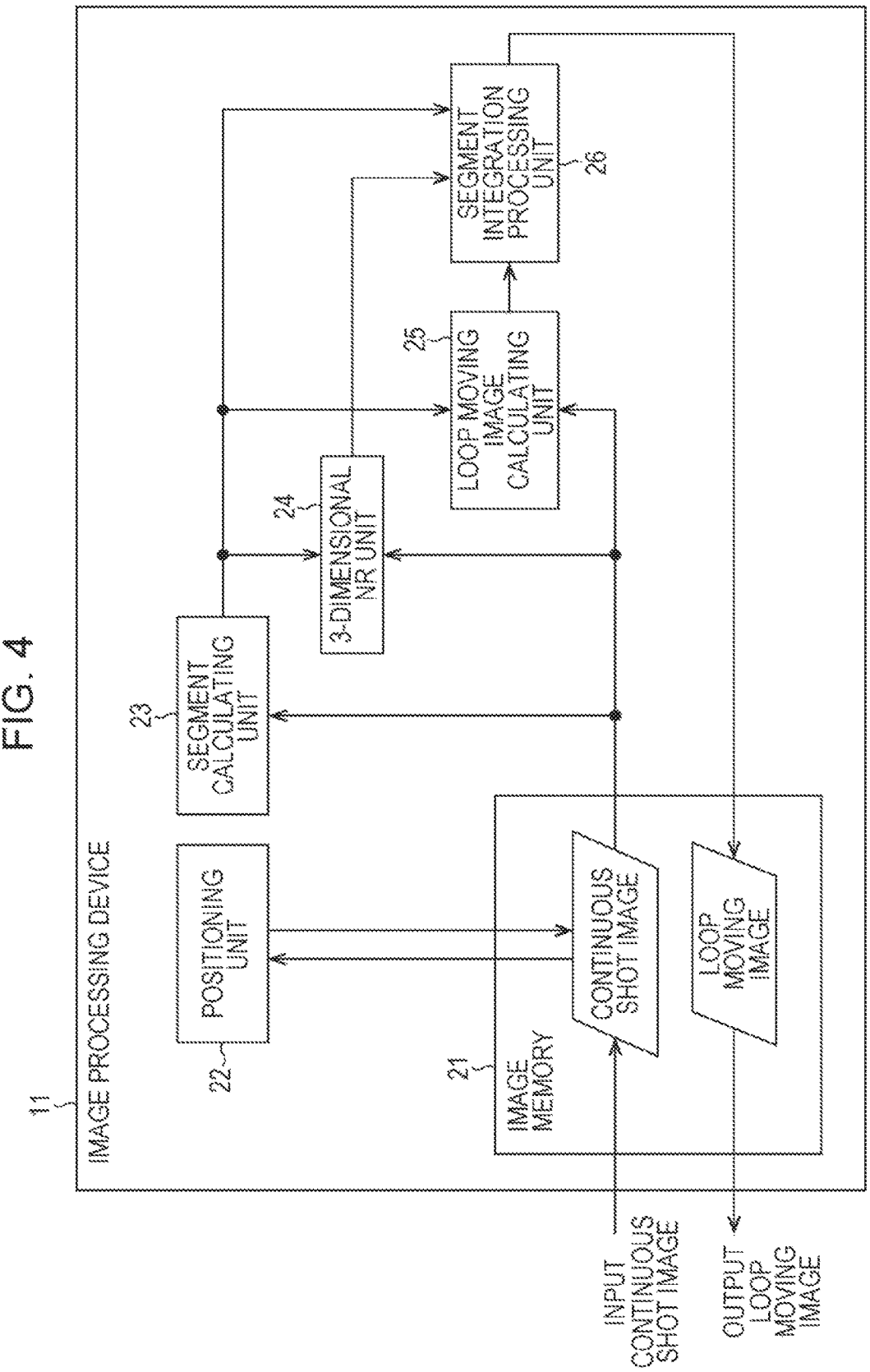
FIG. 4 is a diagram illustrating a configuration example of an image processing device.

Also, an image processing device which takes multiple continuous shot images are input and generates the loop moving image described with reference to FIG. 3 is configured as shown in FIG. 4, for example. FIG. 4 is a diagram illustrating a configuration example of an embodiment of the image processing device to which the present technology has been applied.

An image processing device 11 is configured including image memory 21, a positioning unit 22, a segment calculating unit 23, a 3-dimensional NR (Noise Reduction) unit 24, a loop moving image calculating unit 25, and a segment integration processing unit 26.

The image memory 21 temporarily stores supplied continuous shot images, and also outputs the recorded continuous shot images as necessary. Also, the image memory 21 temporarily records loop moving images supplied from the segment integration processing unit 26, and outputs to an unshown downstream display unit or the like.

The positioning unit 22 reads out the continuous shot images recorded in the image memory 21, performs positioning processing as to the continuous shot images that have been read out, and supply the positioned continuous shot images to the image memory 21 so as to be recorded. The continuous shot images thus positioned are temporarily recorded in the image memory 21, and then supplied to the segment calculating unit 23 through loop moving image calculating unit 25.

The segment calculating unit 23 divides the continuous shot images supplied from the image memory 21 into multiple segments, and generates a segment map for identifying the position of each segment on the continuous shot images. The segment calculating unit 23 supplies the generated segment map to the 3-dimensional NR unit 24 through segment integration processing unit 26.

The 3-dimensional NR unit 24 generates segment images regarding the still segments on the continuous shot images, based on the continuous shot images from the image memory 21 and the segment map from the segment calculating unit 23, and supplies this to the segment integration processing unit 26.

The loop moving image calculating unit 25 generates a segment image or segment loop moving image for each segment on the continuous shot images, based on the continuous shot images from the image memory 21 and the segment map from the segment calculating unit 23, and supplies to the segment integration processing unit 26.

The segment integration processing unit 26 integrates the segment images and segment loop moving images of the segments supplied from the 3-dimensional NR unit 24 and loop moving image calculating unit 25, based on the segment map from the segment calculating unit 23, and generates a loop moving image. The segment integration processing unit 26 supplies the generated loop moving image to the image memory 21 so as to be recorded.

[Description of Loop Moving Image Generating Processing]

Now, upon continuous shot images being supplied to the image processing device 11 and generating of a loop moving image being instructed, the image processing device 11 performs the loop moving image generating processing to generate and output a loop moving image. In the following, loop moving image generating processing by the image processing device 11 will be described with reference to the flowchart in FIG. 5.

In step S11, the image memory 21 receives multiple continuous shot images externally transmitted thereto, and temporarily records these.

In step S12, the positioning unit 22 reads out the continuous shot images from the image memory 21 and performs positioning processing, and supplies the positioned continuous shot images to the image memory 21 so as to be recorded.

For example, the above-described projective transform is performed as positioning processing. That is to say, the positioning unit 22 extracts feature points from the continuous shot images, takes one of the multiple continuous shot images as a reference image and the other continuous shot images are as images to be processed, and obtains a projective transform matrix by RANSAC or the like for each image to be processed. The positioning unit 22 then performs projective transform of the images to be processed by the obtained projective transform matrix such that the same subjects on the continuous shot images are overlaid, thereby performing positioning of the continuous shot images. At this time, the continuous shot images subjected to projective transform are subjected to cropping processing as necessary.

The continuous shot images subjected to positioning in this way are recorded in the image memory 21, and then supplied to the segment calculating unit 23 through loop moving image calculating unit 25.

In step S13, the segment calculating unit 23 performs segmentation as to the continuous shot images supplied from the image memory 21, and divides the continuous shot images into several segments. The segment calculating unit 23 then supplies a segment map obtained by the segmentation to the 3-dimensional NR unit 24 through segment integration processing unit 26.

For example, the segment calculating unit 23 obtains variance values of luminance values of pixels at the same position in the multiple continuous shot images. The segment calculating unit 23 then compares the obtained variance values with a predetermined threshold $\tau$, and in the event that the variance value is equal to or greater than the threshold $\tau$, takes the pixel regarding which the variance value has been obtained as a pixel with motion. That is to say, this is taken as a motion pixel where a subject with motion is displayed. On the other hand, in the event that the variance value is smaller than the threshold the segment calculating unit 23 takes the pixel regarding which the variance value has been obtained to be a still pixel with no motion.

In the event that a subject with no motion is consecutively displayed at a predetermined pixel on the continuous shot images, change in the temporal direction of the luminance value of that pixel should be small. That is to say, the luminance values of the same pixel in the continuous shot images at each point in time would have little variance and be almost the same value, so the variance value of the luminance values of these pixels should be small. Accordingly, the segment calculating unit 23 sets an arbitrary scalar value as the threshold $\tau$, takes pixels of which the variance value of the luminance values of the pixels on the continuous shot images is smaller than the threshold $\tau$ to be still pixels, and pixels where the variance value is threshold $\tau$ or greater to be motion pixels.

Upon determining each pixel of the continuous shot images to be a motion pixel or a still pixel, the segment calculating unit 23 generates a bitmap image indicating regions where there are subjects with motion, based on the determination results. Here, in the event that a pixel in the continuous shot images at the same position as a pixel in the bitmap image is a motion pixel, the pixel value of the pixel in the bitmap image is set to "1", and in the event that a pixel in the continuous shot images at the same position is a still pixel, the pixel value of the pixel in the bitmap image is set to "0".

Accordingly, on the bitmap image, a region made up of pixels of which the pixel value is "1", i.e., a region where the pixel values of mutually adjacent pixels is "1", indicates a region where the region in the continuous shot images at the same position as that region is a region where a subject with motion is displayed. Hereinafter, a region made up of pixels of which the pixel value is "1" on the bitmap image will also be called a motion region, and a region made up of pixels of which the pixel value is "0" will also be called a still region.

At the time of generating a bitmap image, simply performing threshold processing on the variance values of luminance values of the pixels in the continuous shot images will result in small-area motion regions and still regions being scattered throughout the bitmap image like noise.

Accordingly, the segment calculating unit 23 takes small-area motion regions and still regions on the bitmap image as isolated points, subjects the bitmap image to filtering processing using an isolated point removal filter such as a morphological filter or the like, and performs connection processing of the pixels on the bitmap image.

That is to say, isolated points are removed from upon the bitmap image.

With the processing using the isolated point removal filter, expansion and contraction processing of motion regions and still regions of the bitmap image is performed. For example, motion regions on the bitmap image are expanded by one pixel worth, or narrowed inwards by one pixel worth. Accordingly, minute holes and protrusions in shapes such as the motion regions and still regions are removed, thereby enabling stable gradation. Note that how many pixels worth of expansion and contraction processing is to be performed on the motion regions and still regions, in what order, is optional.

Upon subjecting the bitmap image to filtering processing, the segment calculating unit 23 takes motion regions made up of pixel values of "1" on the bitmap image as motion segments, and takes still regions made up of pixel values of "0" as still segments. Accordingly, the pixels making up one segment are pixels having the same pixel values consecutively arrayed in the spatial direction.

Also, the segment calculating unit 23 assigns a label (ID) identifying the segment to each segment on the bitmap image, and uses the bitmap image to which labels have been provided to the segments as a segment map. Accordingly, labels are provided to each of segment SG1 through segment SG4 in FIG. 3, for example.

Note that an arrangement may be made wherein segmentation is not performed by the segment calculating unit 23 but rather where the user manually instructs segments of the continuous shot images, using an interactive tool. Also, a segment map generated with another program may be supplied as well.

Upon a segment map being generated, the segment map is supplied to the 3-dimensional NR unit 24 through segment integration processing unit 26, and the processing advances from step S13 to step S14.

In step S14, the 3-dimensional NR unit 24 performs 3-dimensional NR processing as to the still segments on the continuous shot images, based on the continuous shot images from the image memory 21 and the segment map from the segment calculating unit 23, thereby generating a segment image.

For example, the 3-dimensional NR unit 24 identifies the still segment regions on the continuous shot images from the segment map. The 3-dimensional NR unit 24 then generates an average image of the images of still segments in several continuous shot images, and takes the averaged image as a segment image. That is to say, the average value of pixel values of pixels at the same position in a still segment of several continuous shot images is taken as the pixel value of the pixel of the segment image at the same position at that pixel. The 3-dimensional NR unit 24 supplies the segment images for the still segment regions that have been generated to the segment integration processing unit 26.

Note that which continuous shot images of the multiple continuous shot images are to be used for the 3-dimensional NR processing may be decided in any way. For example, a predetermined number of continuous frames with little change in luminance through the overall still segment may be selected and segment images generated from the continuous shot images of the selected frames. Alternatively, a segment image may be generated using the continuous shot images of all of the frames.

Thus, by overlaying the still segment regions of the continuous shot images in the temporal direction, noise can be removed from the continuous shot images, and a high-quality segment image can be obtained.

With general continuous shot images, even if the subject seems to be still, slight motion normally remains, so if a loop moving image is generated regarding such a region, slight subject motion and noise are recognizable at the time of playing the loop moving image.

Accordingly, with a still segment, a segment image is generated by the 3-dimensional NR processing without forming a loop moving image of the segment region, such that the same segment image is continuously displayed at the time of playing the loop moving image, whereby a high-quality loop moving image can be presented. Accordingly, at the time of playing the loop moving image, noise can be reduced and the motion of the subject can be made completely still in the still segment region, so the dramatic impact of making it look as if a part of a still image is moving can be emphasized.

In step S15, the loop moving image calculating unit 25 calculates a cumulative SAD value for each motion segment, based on the segment map from the segment calculating unit 23 and the continuous shot images from the image memory 21.

For example, the loop moving image calculating unit 25 selects, of the frames of the multiple continuous shot images, two arbitrary frames distanced by a number of frames indicated by the shortest cycle length Lmin or more, as frames to be processed. The loop moving image calculating unit 25 then performs the calculation described with reference to FIG. 2 regarding the section of consecutive frames indicated by the cumulative tap length Lsad, centered on the selected frames to be processed, so as to obtain a cumulative SAD value. Note that at the time of calculating the cumulative SAD value, only the pixels of the segment regions which are the object of processing on the continuous shot images are used to calculate the sum of absolute difference.

The loop moving image calculating unit 25 changes the pairs of frames to be processed while calculating the cumulative SAD value for each pair of frames, and takes a pair of frames of which the calculated cumulative SAD value is the smallest as candidates of starting edge and ending edge frames for the segment loop moving image.

Upon the cumulative SAD value of each motion segment being calculated thus, the loop moving image calculating unit 25 selects, from these motion segments, a motion segment of which the cumulative SAD value is the smallest. The loop moving image calculating unit 25 then takes the number of frames between the pair of frames which were taken as the object of processing at the time of calculating the cumulative SAD value of the selected motion segment, as the cycle of the entire loop moving image to be obtained (hereinafter called repeat cycle. That is to say, the number of frames which is the repeat cycle is the total number of frames making up the loop moving image.

Also, the pair of frames for the selected motion segment are the starting edge and ending edge of the segment loop moving image of that motion segment.

Further, upon the repeat cycle length of the loop moving image being decided, the loop moving image calculating unit 25 recalculates the cumulative SAD value for the motion segments other than the selected motion segment. That is to say, a pair of frames distanced by the repeat cycle length where the cumulative SAD value is the smallest is detected for each motion segment, and the detected pair of frames is taken as the starting edge and ending edge frames of the segment loop moving image.

By making pairs of frames distanced by the same number of frames to be the starting edge and ending edge of the segment loop moving image for each motion segment, the entire cycle of each segment loop moving image can be made to be the same length. Moreover, the starting edge and ending edge of the segment loop moving image can be made to be different frames (timings) for each motion segment, so at the time of transition from the ending edge to the starting edge of each motion segment, the frames with the smallest visual change can be used for the starting edge and ending edge. Accordingly, a segment loop moving image with higher quality can be obtained.

Now, even in the event that the cycle of each segment group is different, recalculation of the cumulative SAD value is not performed if the loop moving image is to be output to a device which can simultaneously play the segment loop moving images as a single loop moving image. In such a case, the device which plays the loop moving image needs a function to present while integrating the segment images and multiple segment loop moving images with different cycles.

Also, in the event that segment loop moving images with different cycles per segment are generated and a loop moving image is generated from these segment loop moving image with difference cycles, an arrangement may be made wherein the playing speed is adjusted so that the cycles of the segment loop moving images match, and then the loop moving image is output. In such a case, the longest cycle of the cycles for the segments may be used as a reference cycle for all, with the playing speed begin adjusted for segment loop moving image with shorter cycles, so as to match the reference cycle.

Adjustment of the playing speed may involve simply displaying several frame images of a short-cycle segment loop moving image being displayed multiple times in a row. In order to obtain more precise results, a frame image of a time position which is to be newly added may be generated so that motion can be smoothly linked, suing two frame images existing before and after that time position.

As described above, at least the following three cases can be conceived as loop moving images. That is to say, a case of generating a loop moving image so that the cycles of all segment loop moving images are all the same, a case of generating a loop moving image with some of the segment loop moving images having different cycles, and a case of generating a loop moving image with one cycle overall by adjusting the playing speed of several segment loop moving images having different cycles.

Now, in the event that a loop moving image is generated of segment loop moving images having different cycles, there is the need to simultaneously play the segment loop moving images having different cycles at the playing side of the loop moving image. Also, in the event of performing adjustment of the playing speed, cycle adjustment of the segment loop moving images is performed by inserting frame images or the like, as described above.

Upon the cumulative SAD value of the motion segments, and the frame pairs to serve as starting edge and ending edge of the segment loop moving images being obtained, the processing advances from step S15 to step S16.

In step S16, the loop moving image calculating unit 25 selects one motion segment from the one or multiple motion segments as a motion segment to be processed, based on the segment map.

In step S17, the loop moving image calculating unit 25 determines whether or not the motion segment to be processed can be formed into a loop moving image. For example, in the event that the cumulative SAD value of the motion segment to be processed is within a predetermined threshold, determination is made that a loop moving image can be formed.

In the event that determination is made in step S17 that a loop moving image can be formed, in step S18 the loop moving image calculating unit 25 generates a segment loop moving image of the motion segment to be processed, based on the continuous shot images.

For example, with regard to a section where two frames taken as the object of processing at the time of calculation of the cumulative SAD value of the motion segment are the starting edge and ending edge respectively, the loop moving image calculating unit 25 clips out motion segment region images from the continuous shot images of the frames in that section. The loop moving image calculating unit 25 the subjects the images that have been clipped out to the above-described cross-fading processing, thereby generating a segment loop moving image, which is supplied to the segment integration processing unit 26.

The segment loop moving image generated in this way is a moving image where, of images of a motion segment in continuous shot images of multiple continuous frames, images between two images with higher similarity are repeatedly displayed.

If cross-fading processing is performed in this way to generate a segment loop moving image, manifestation of the seam at the time of transition form the ending edge of the segment loop moving image to the starting edge can be alleviated. However, there are cases wherein subjects of multiple continuous shot images are mixed in a translucent manner at portions where the pictures of the continuous shot images (images of the motion segment) are different, such that the seam becomes conspicuous.

Accordingly, segment loop moving images may be generated by a graph cut method where an optimal transition timing is obtained in increments of pixels, so as to blend continuous shot images of different frames with higher quality.

In the event of splicing two images by overlaying a part thereof, the graph cut method obtains which images' pixels to use of the two images at the overlapping portion of the overlaid images to reduce visual non-continuity due to splicing of the images. That is to say, an optimal seam is calculated taking into consideration the continuity of pixel values in each image and the continuity of pixel values between the two images, and the two images are connected at this seam.

In comparison with this, in the event of splicing multiple overlaid images by the graph cut method such that the entire region of the multiple frame images are overlaid, basically the same processing is performed as with the case of overlaying a part of two images. In this case, the seam where the multiple images are spliced will be a plane rather than a line. That is to say, the continuity of the pixel values in each image and the continuity of pixel values between the multiple images are taken into consideration, with one pixel of the pixels at the same position in the images being taken as a pixel on the plane serving as the seam of the images.

Accordingly, in the event of generating a segment loop moving image by the graph cut method with regard to a section made up of images of a motion segment of continuous frames, blending of images is performed based on images of frames near the starting edge of that section and images of frames near the ending edge thereof. That is to say, we will call a section made up of several frames near the starting edge of a section to be processed and several frames near the ending edge thereof, a blended section.

In this case, a 3-dimensional seam plane is obtained based on images of the motion segments of the frames included in the blended section, blending processing of the images of the motion segment is performed based on that plane, and a new motion segment image is generated. The new motion segment image generated in this way is taken as a motion segment image of the starting edge or ending edge frame.

Note that blending of images according to the graph cut method is described in detail in, for example, "Vivek Kwatra, Arno Schodl, Irfan Essa, Greg Turk and AaronBobick, "Graphcut Textures: Image and Video Synthesis Using Graph Cuts" Toappear in Proc. ACM Transactions on Graphics, SIGGRAPH 2003" etc.

Also, besides cross-fading and the graph cut method, random dissolve and the like may be used as a method to blend images of motion segment regions in several continuous shot images when generating a segment loop moving image.

Upon the processing in step S18 being performed and a segment loop moving image being generated, the processing subsequently advances to step S20.

Also, in the event that determination is made in step S17 that a loop moving image cannot be formed of the motion segment to be processed, in step S19 the loop moving image calculating unit 25 generates a segment image of the motion segment to be processed, based on the continuous shot images.

For example, the loop moving image calculating unit 25 clips out the images of the motion segment region to be processed in the continuous shot images of the predetermined frames, and takes the clipped-out images as a segment image without change.

In the event that the cumulative SAD value obtained regarding a motion segment is great, this means that it will be difficult to repeatedly play the image group of that motion segment region with a small visual difference. Accordingly, for such a motion segment, a segment image which is a still image is continuously presented at the time of playing the loop moving image, thereby preventing the loop moving image from being visually non-continuous.

Note that the frame of the continuous shot images to be clipped out as the segment image may be any frame, such as the head frame of the continuous shot images, a frame at an intermediate position, or the like.

Also, performing 3-dimensional NR processing when generating such a segment image of a motion segment. However, the motion of the subject is great in a motion segment, so the content of the image (picture) greatly differs as to the previous and following frames, so correctly extracting the noise component is difficult. Accordingly, 3-dimensional NR processing is preferably not performed as to motion segments.

Upon a segment image of a motion segment being generated in this way, the loop moving image calculating unit 25 supplies the generated segment image to the segment integration processing unit 26, and the processing advances to step S20.

Upon a segment loop moving image being generated in step S18 or a segment image being generated in step S19, in step S20 the loop moving image calculating unit 25 determines whether or not all motion segments have been processed.

In the event that determination is made in step S20 that not all motion segments have been processed as the object of processing, the processing returns to step S16 and the above-described processing is repeated.

On the other hand, in the event that determination is made in step S20 that all motion segments have been processed as the object of processing, the processing advances to step S21.

In step S21, the segment integration processing unit 26 performs segment integration processing based on the segment map supplied from the segment calculating unit 23, and generates a loop moving image. That is to say, the segment integration processing unit 26 integrates the segment images and segment loop moving images supplied from the 3-dimensional NR unit 24 and loop moving image calculating unit 25, to generate a single loop moving image.

For example, as described with reference to FIG. 3, images of frames of corresponding segment images and segment loop moving images of the segments are duplicated, integrated at the same positions as with those segments, and an image of one frame worth of the loop moving image is formed.

Upon having generated a loop moving image, the segment integration processing unit 26 supplies the generated loop moving image to the image memory 21 so as to be recorded, and ends the loop moving image generating processing. The loop moving image recorded in the image memory 21 in this way is subsequently supplied to an unshown display unit or the like.

While description has been made above that a loop moving image is generated and output, an arrangement may be made wherein the images of the segments are not integrated by recorded in the image memory 21 individually, and thus output. In such a case, the segment integration processing unit 26 records the segment images and segment loop moving images of the segments in the image memory 21 as they are, without integrating.

In this case, the cycles of the segment loop moving images of the segments do not necessarily have to be the same, and in the event that the cycles of the segment loop moving images of the segments differ, recalculation of the cumulative SAD value is not performed in step S15 as described above.

In the event that the segment images and segment loop moving images of the segments are recorded in the image memory 21 in a correlated manner, the segment images and segment loop moving images of the segments are played as a loop moving image at a device downstream while being integrated. Alternatively, each segment loop moving image may be individually played as a single moving image.

Further, while description has been made above that the segment loop moving images of motion segments are played, but the images of motion segments for playing the loop moving image may be images of any format as long as images playable as loop moving images. For example, images in a motion segment region on continuous shot images of multiple continuous planes may be clipped out, and an image group made up of these images of the motion segment may be output as images of the motion segment for playing the loop moving image. In this case, by repeatedly displaying the images making up the image group of the motion segment, the image group thereof can be played as a single loop moving image.

Thus, the image processing device 11 divides continuous shot images into several segments, and generates a segment image or segment loop moving image for each segment. The image processing device 11 then integrates these segment images and segment loop moving images to generate a single loop moving image.

By generating a segment image or segment loop moving image for each segment in this way, a high-quality image appropriate for each segment can be generated even in the event that multiple subjects with complicated motions are included in the continuous shot images. Accordingly, a high-quality loop moving image can be obtained more easily.

In the event of generating a loop moving image without performing segment division, for example, in the event that subjects with multiple different motions are included the continuous shot images, rather than a single motion, a halfway loop moving image is undesirably generated that takes into consideration the motion of each subject, so a desired loop moving image cannot be obtained.

On the other hand, by dividing the continuous shot images into segments in accordance with change in luminance and motions of subjects in the continuous shot images, and breaking down the units in which processing is performed into small units, the quality of the loop moving image ultimately obtained as a result can be improved. For example, an optimal transition timing for segment loop moving images can be set for each segment, or a different repeat cycle can be provided for each segment loop moving image. Also, with still segments, not only can processing be partially eliminated, but also high-quality segment images can be obtained by 3-dimensional NR processing.

<Modification 1>
[Configuration Example of Image Processing Device]

Now, while description has been made above that the generated loop moving image is output from the image processing device 11, an arrangement may be made where the loop moving image is played at the image processing device 11.

Figure 6:
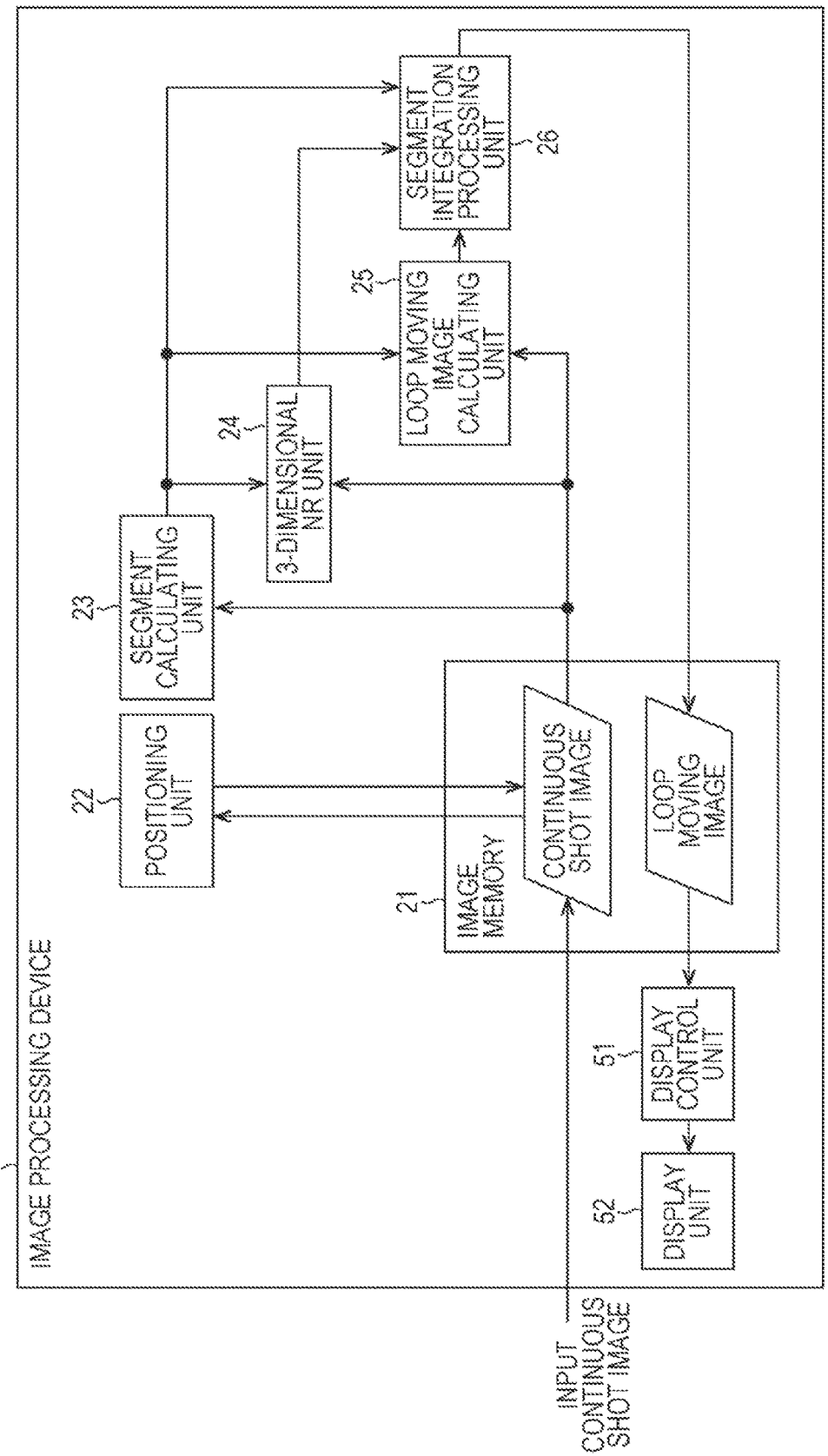
FIG. 6 is a diagram illustrating another configuration example of an image processing device.

In such a case, the image processing device 11 is configured such as shown in FIG. 6, for example. Note that in FIG. 6, portions corresponding to the case in FIG. 4 are denoted with the same reference numerals, and description thereof will be omitted as appropriate.

The image processing device 11 in FIG. 6 differs from the configuration of the image processing device 11 in FIG. 4 in that a display control unit 51 and display unit 52 have been provided to the configuration of the image processing device 11 in FIG. 4, and other configurations are the same.

The display control unit 51 reads out the loop moving image from the image memory 21 and supplies this to the display unit 52, so that the loop moving image is displayed. The display unit displays the loop moving image supplied form the display control unit 51 in accordance with the control of the display control unit 51.

<Second Embodiment>
[Configuration Example of Camera Apparatus]

Also, while an example where a loop moving image is generated upon continuous shot images being input has been described above, an arrangement may be made wherein determination is made upon continuous shot images being input regarding whether or not a high-quality loop moving image can be generated using the continuous shot images as a material, with the determination results being displayed as necessary.

For example, we will say that a preview image obtained at the stage of a user directing a camera toward a subject serving as continuous shot images, and an image shot by pressing a shutter being a high-resolution still image. In this case, in the event that determination is made that a high-quality loop moving image cannot be generated from the continuous shot images, an error notification is displayed to that effect.

Also, in the event that determination is made that a high-quality loop moving image can be generated from the continuous shot images, upon the shutter being pressed a high-resolution still image is shot, and also a loop moving image is generated. This not only can a loop moving image be generated with a single shutter operation, but also the user can be notified at the preview stage regarding whether or not a loop moving image can be generated.

Figure 7:
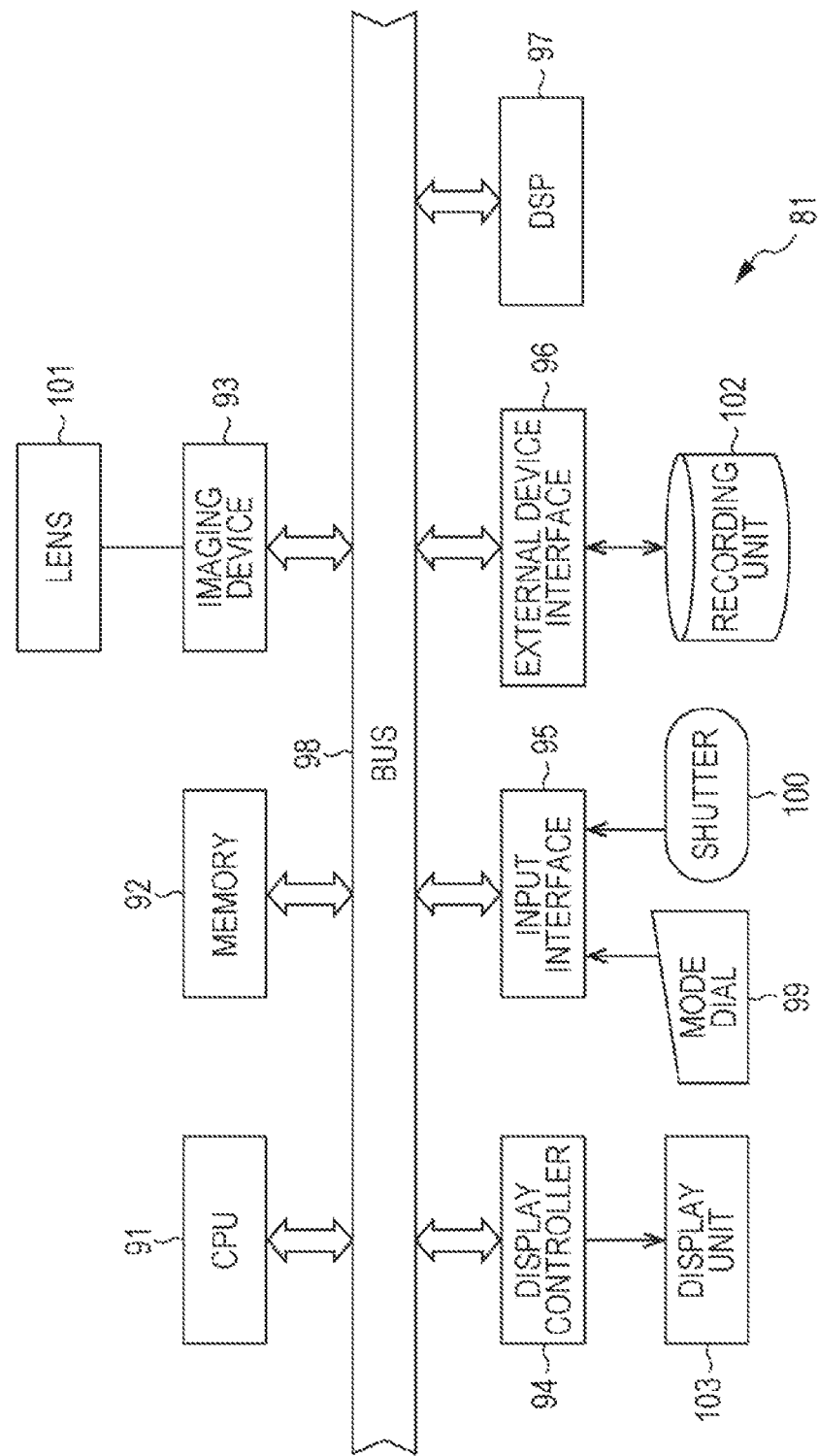
FIG. 7 is a diagram illustrating a configuration example of a camera apparatus.

In such a case, the camera apparatus is configured as shown in FIG. 7, for example.

A camera apparatus 81 is configured of a camera for example, and shoots still images and moving images in accordance with user operations. With the camera apparatus 81, a CPU (Central Processing Unit) 91, memory 92, an imaging device 93, a display controller 94, an input interface 95, an external device interface 96, and a DSL (Digital Signal Processor) 97 are mutually connected via a bus 98.

The CPU 91 controls the overall operations of the camera apparatus 81. For example, upon a mode dial 99 being operated and a shooting mode being instructed, signals corresponding to the operations at the mode dial 99 are supplied from the mode dial 99 to the CPU 91 via the input interface 95. Thereupon, the CPU 91 controls the shooting processing in the shooting mode corresponding to the signals from the mode dial 99.

For example, a normal shooting mode for shooting high-resolution still images, and a loop moving image shooting mode for shooting loop moving images, are selectable as shooting modes.

Also, upon a shutter 100 being operated, the CPU 91 causes the imaging device 93 to image an image in accordance with signals supplied from the shutter 100 via the input interface 95. The imaging device 93 is, for example, a CCD (Charge Coupled Devices) or the like, and images an image by performing photoelectric conversion of incident light from a subject via a lens 101. The image that has been imaged by the imaging device 93 is supplied to the memory 92 and temporarily held, and is thereafter subjected to image processing by the DSP 97, and supplied to a recording unit 102 via the external device interface 96 or supplied to a display unit 103 via the display controller 94.

The recording unit 102 records data of images and so forth supplied from the external device interface 96. The display unit 103 displays images supplied from the display controller 94.

[Functional Configuration Example of Image Processing Device]

Figure 8:
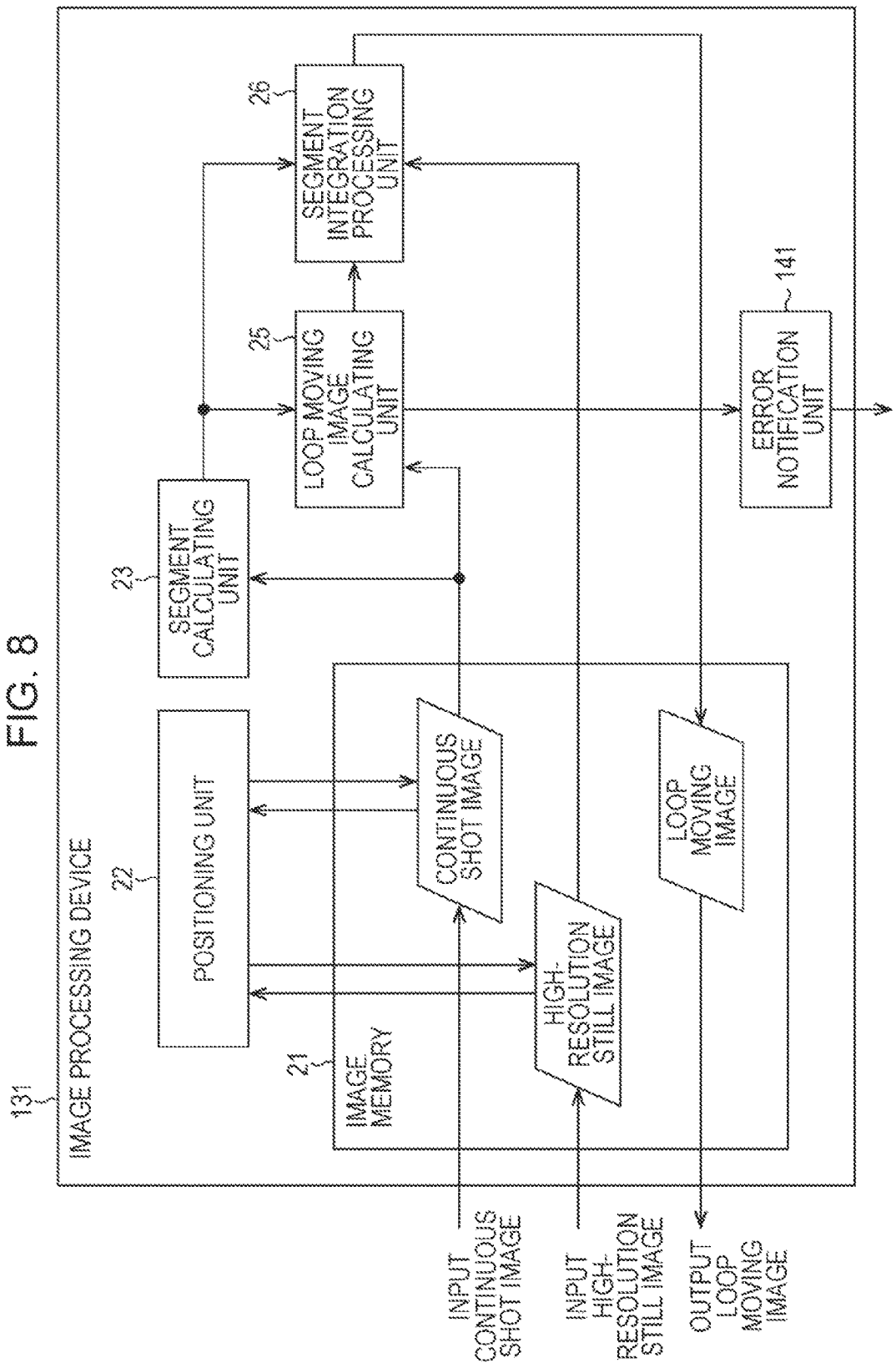
FIG. 8 is a diagram illustrating a configuration example of an image processing unit.

Next, a configuration example of an image processing unit realized by the CPU 91 and DSP 97 executing a program will be described. FIG. 8 is a diagram illustrating a functional configuration example of the image processing unit. Note that in FIG. 8, portions corresponding to the case in FIG. 4 are denoted with the same reference numerals, and description thereof will be omitted as appropriate.

An image processing unit 131 is configured of the image memory 21, positioning unit 22, segment calculating unit 23, loop moving image calculating unit 25, segment integration processing unit 26, and an error notifying unit 141.

Recorded in the image memory 21 are low-resolution continuous shot images imaged by the camera apparatus 81 as a preview image, and a high-resolution still image imaged by the camera apparatus 81. Also, the image memory 21 also records a loop moving image generated by the segment integration processing unit 26.

Based on the segment map from the segment calculating unit 23, the segment integration processing unit 26 generates a loop moving image from the segment loop moving images from the loop moving image calculating unit 25 and high-resolution still image from the image memory 21.

The error notifying unit 141 determines whether or not a loop moving image can be formed of the continuous shot images, based on the cumulative SAD values of the motion segments of the continuous shot images supplied from the loop moving image calculating unit 25, and outputs the determination results thereof.

[Description of Shooting Processing]

Next, shooting processing performed by the camera apparatus 81 will be described. Upon the user operating the camera apparatus 81 and instructing starting of shooting of an image, the camera apparatus 81 starts shooting processing, and shoots images according to operations of the user. The following is a description of the shooting processing by the camera apparatus 81 with reference to the flowchart in FIG. 9.

In step S51, the CPU 91 determines whether or not a normal shooting mode has been selected, based on signals supplied from the mode dial 99.

In the event that determination is made in step S51 that the normal shooting mode has been selected, in step S52 the camera apparatus 81 shoots a high-quality still image in accordance with operations of the shutter 100 by the user, and the shooting processing ends.

That is to say, the imaging device 93 performs photoelectric conversion of incident light from the lens 101 to shoot a high-resolution still image, and records this in the memory 92. The high-resolution still image recorded in the memory 92 is processed by the DSP 97 as necessary, supplied to the recording unit 102, and recorded.

On the other hand, in the event that determination is made in step S51 that the normal shooting mode is not selected, i.e., that the loop moving image shooting mode is selected, the processing advances to step S53.

In step S53, the camera apparatus 81 performs loop moving image generating processing, and the shooting processing ends. Note that. With the loop moving image generating processing, shooting of a loop moving image is performed.

[Description of Loop Moving Image Generating Processing]

Figure 9:
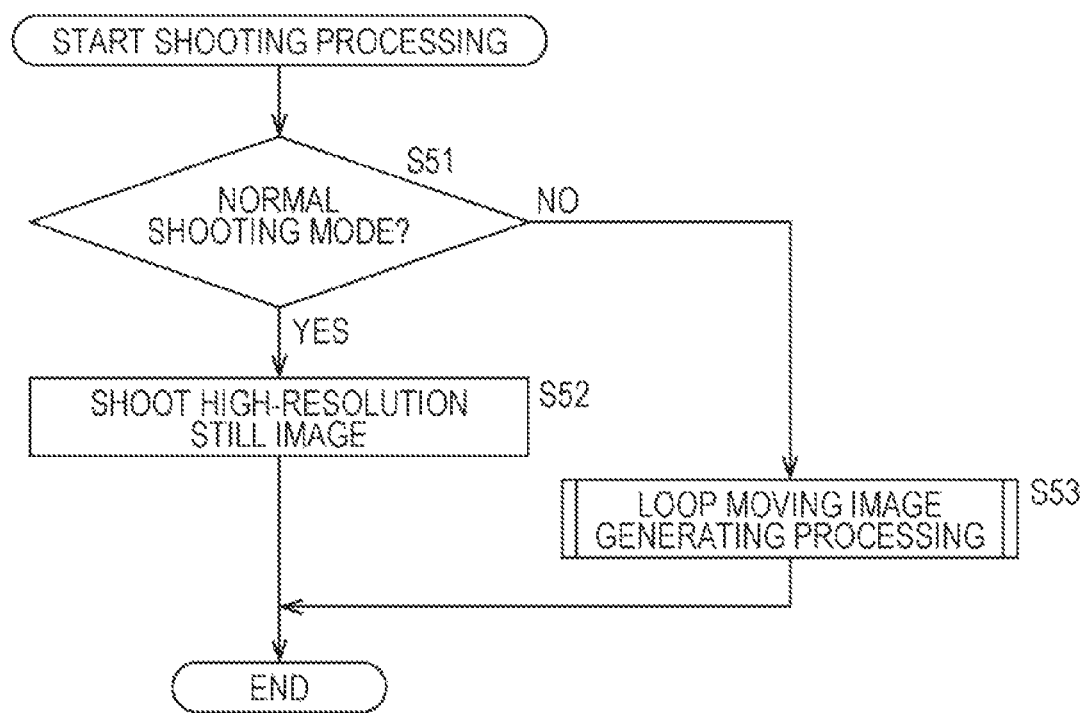
FIG. 9 is a flowchart for describing shooting processing.

Next, the loop moving image generating processing corresponding to the processing of step S53 in FIG. 9 will be described.

In step S81, the camera apparatus 81 start preview shooting. That is to say, the imaging device 93 performs photoelectric conversion of incident light from the lens 101 under instructions from the CPU 91, and supplies the continuous shot images obtained as the result thereof to the display unit 103 and image memory 21. Continuous shot images of each frame are shot at predetermined time intervals at the imaging device 93.

The image memory 21 temporarily records the continuous shot images supplied from the imaging device 93. Also, the display unit 103 displays the continuous shot images supplied from the imaging device 93 via the display controller 94. Accordingly, the user can decide the angle and composition of the loop moving image to be shot thereafter, while watching the continuous shot images serving as a preview image displayed on the display unit 103.

Figure 5:
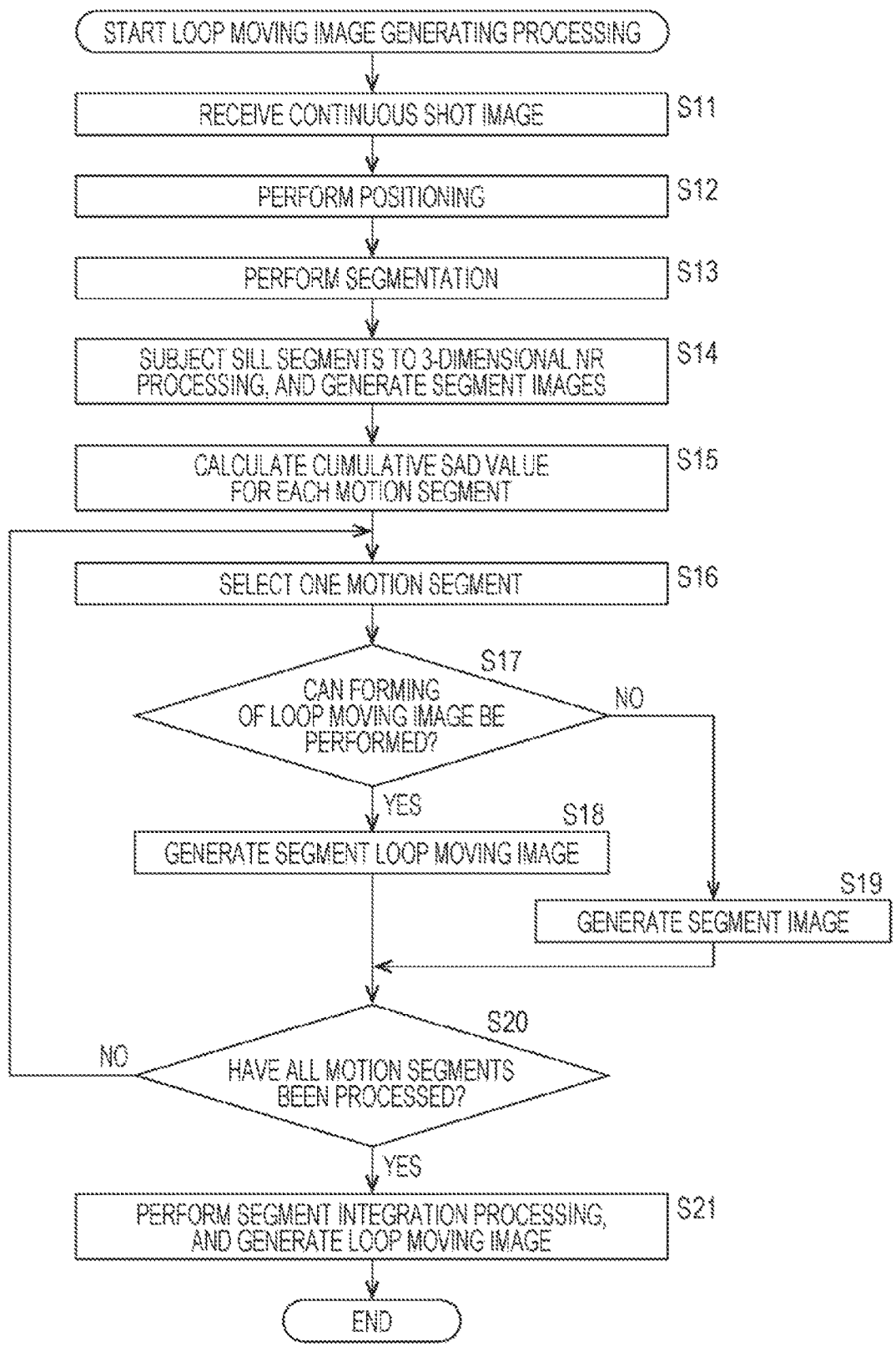
FIG. 5 is a flowchart for describing loop moving image generating processing.

In step S82, the positioning unit 22 reads out the continuous shot images from the image memory 21 and performs positioning processing, and supplies the positioned continuous shot images to the image memory 21 so as to be recorded. In step S82, processing the same as with step S12 in FIG. 5 is performed.

That is to say, a projective transform matrix is obtained by RANSAC or the like for example, projective transformation of the continuous shot images to be processed by the obtained projective transform matrix is performed, and positioning of the continuous shot images is performed. The continuous shot images thus positioned are recorded in the image memory 21, and then supplied to the segment calculating unit 23 and loop moving image calculating unit 25.

In step S83, the segment calculating unit 23 performs segmentation of the continuous shot images supplied from the image memory 21, and divides the continuous shot images into several segments. The segment calculating unit 23 then supplies a segment map obtained by segmentation to the loop moving image calculating unit 25.

In step S84, The loop moving image calculating unit 25 calculates the cumulative SAD value for each motion segment, based on the continuous shot images from the image memory 21 and the segment map from the segment calculating unit 23.

For example, the loop moving image calculating unit 25 takes, of the frames of the multiple continuous shot images, two arbitrary frames distanced by a number of frames indicated by the shortest cycle length Lmin or more, as frames to be processed. The loop moving image calculating unit 25 then obtains a cumulative SAD value regarding the section of consecutive frames indicated by the cumulative tap length Lsad, centered on the selected frames to be processed. Note that at the time of calculating the cumulative SAD value, only the pixels of the segment regions which are the object of processing on the continuous shot images are used to calculate the sum of absolute difference.

The loop moving image calculating unit 25 changes the pairs of frames to be processed while calculating the cumulative SAD value for each pair of frames, and takes the smallest value of the calculated cumulative SAD value to be the cumulative SAD value of the motion segment to be processed. The loop moving image calculating unit 25 supplies the cumulative SAD value of the motion segments thus obtained to the error notifying unit 141.

In step S85, the error notifying unit 141 determines whether or not a loop moving image can be formed of the continuous shot images, based on the cumulative SAD values of the motion segments supplied from the loop moving image calculating unit 25. For example, in the event that the smallest cumulative SAD value of the cumulative SAD values of the motion segments is within a predetermined threshold determined beforehand, the error notifying unit 141 determines that a loop moving image can be formed.

In the event that determination is made in step S85 that a loop moving image cannot be formed, in step S86, the error notifying unit 141 performs error notification. For example, the error notifying unit 141 generates information to the effect that a loop moving image cannot be formed of the continuous shot images, i.e., information to the effect that a loop moving image cannot be shot, and supplies the generated information to the display unit 103 to be displayed.

Accordingly, the user can tell that the subject shot as the continuous shot images is not suitable for shooting of a loop moving image. Thus, the user can handle the situation by changing the subject, or changing the angle, so as to enable a desired loop moving image to be shot.

Upon an error notification being made, the processing thereafter returns from step S86 to step S82, and the above-described processing is repeated. That is to say, determination is made regarding whether or not, based on multiple frames of newly-shot continuous shot images, the continuous shot images can be formed into a loop moving image.

Note that notification to the user may be performed by displaying a text message or shapes on the display unit 103, or may be performed by audio.

Also, in the event that determination is made in step S85 that a loop moving image can be formed, in step S87 the imaging device 93 shoots a high-resolution still image. That is to say, upon the user pressing the shutter 100, the CPU 91 instructs the imaging device 93 to shoot a high-resolution still image.

The imaging device 93 performs photoelectric conversion of incident light from the lens 101 in accordance with instructions of the CPU 91, and supplies the high-resolution still image obtained as the result thereof to the image memory 21. Note that here, a high-resolution still image is a still image which has higher resolution than the continuous shot images, i.e., which has a greater number of pixels.

Note that an arrangement may be made wherein, in the event that determination is made in step S85 that a loop moving image can be formed, the error notifying unit 141 makes a display on the display unit 103 to the effect that a loop moving image can be shot (generated). This display may be a text message, or may be of particular shapes, symbols, or the like. Also, audio may be output to the effect that a loop moving image can be shot.

In step S88, the positioning unit 22 reads out the high-resolution still image and continuous shot images from the image memory 21, and performs positioning processing.

For example, the positioning unit 22 reads out from the image memory 21 the continuous shot images of multiple frames before processing regarding which determination has been made in step S85 that a loop moving image can be formed, and the high-resolution still image shot in step S87.

The positioning unit 22 performs up-sampling of the continuous shot images to the same size (resolution) as the high-resolution still image, and performs positioning of the continuous shot images with the high-resolution still image as a reference image and the continuous shot images following up-sampling as the images to be processed. That is to say, a projective transform matrix is obtained by RANSAC or the like, and projective transformation of the continuous shot images is performed by the projective transform matrix.

The continuous shot images thus positioned are recorded in the image memory 21, and then supplied to the segment calculating unit 23 and loop moving image calculating unit 25. Also, the high-resolution still image recorded in the image memory 21 is supplied to the segment integration processing unit 26.

In step S89, the segment calculating unit 23 performs segmentation as to the continuous shot images supplied from the image memory 21, and divides the continuous shot images into several segments. The segment calculating unit 23 then supplies a segment map obtained by the segmentation to the loop moving image calculating unit 25 and segment integration processing unit 26.

In step S90, the segment integration processing unit 26 generates segment images of each still segment, based on the segment map from the segment calculating unit 23 and the high-resolution still image from the image memory 21. For example, the segment integration processing unit 26 clips out an image of a still segment region in the high-resolution still image, and takes the clipped out image as a segment image of the still segment without change.

After the processing of step S90 has been performed, the processing of step S91 through S96 is performed, but this processing is the same as the processing of step S15 through step S20 in FIG. 5, so description thereof will be omitted. In step S91 through step S96, segment images or segment loop moving images of the motion segment images are generated and supplied to the segment integration processing unit 26 from the loop moving image calculating unit 25.

Note however, that with step S91 through step S96, continuous shot images converted (up-sampled) to the same resolution as that of the high-resolution still image are used to generate the segment images and segment loop moving images.

In the event that determination is made in step S96 that all motion segments have been processed, the processing advances to step S97.

In step S97, the segment integration processing unit 26 performs segment integration processing based on the segment map supplied from the segment calculating unit 23, and generates a loop moving image. That is to say, the segment integration processing unit 26 integrates the segment image generates in the processing in step S90, and the segment images and segment loop moving images supplied from the loop moving image calculating unit 25, and generates a single loop moving image.

For example, as described with reference to FIG. 3, images of frames of corresponding segment images and segment loop moving images of the segments are duplicated, integrated at the same positions as with those segments, and an image of one frame worth of the loop moving image is formed.

Upon having generated a loop moving image, the segment integration processing unit 26 supplies the generated loop moving image to the image memory 21 so as to be recorded. The loop moving image generating processing then ends, following which the processing returns to step S53 in FIG. 9, and the shooting processing also ends.

The loop moving image recorded in the image memory 21 in this way is then supplied to the recording unit 102 and recorded, supplied to the display unit 103 and displayed, or the like. Note that an arrangement may be made where the images of each segment are individually recorded in the image memory 21 and output without being integrated.

As described above, the camera apparatus 81 determines whether or not continuous shot images are suitable for forming a loop moving image at the stage of the continuous shot images having been input, and in the event that the continuous shot images are not suitable for forming a loop moving image, makes a presentation to the user to the effect that a loop moving image cannot be formed. Accordingly, the user can tell at the state of performing the preview shooting that a loop moving image cannot be shot, and can immediately redo the shooting. Accordingly, the user can suitably shoot a loop moving image, and can obtain a high-quality loop moving image more easily.

Also, with the camera apparatus 81, a segment image or segment loop moving image is generated for each segment, so even in the event that multiple subjects with complicated motions are included in the continuous shot images, a high-quality image appropriate for each segment can be generated. Accordingly, a high-quality loop moving image can be obtained more easily.

<Modification 2>
[Configuration Example of Image Processing Unit]

While description has been made above that, in the event of dividing the continuous shot images into segments and generating a loop moving image, if the continuous shot images are not suitable for forming a loop moving image the user is notified to that effect, the user may also be notified in the event that the continuous shot images are not divided into segments.

Figure 11:
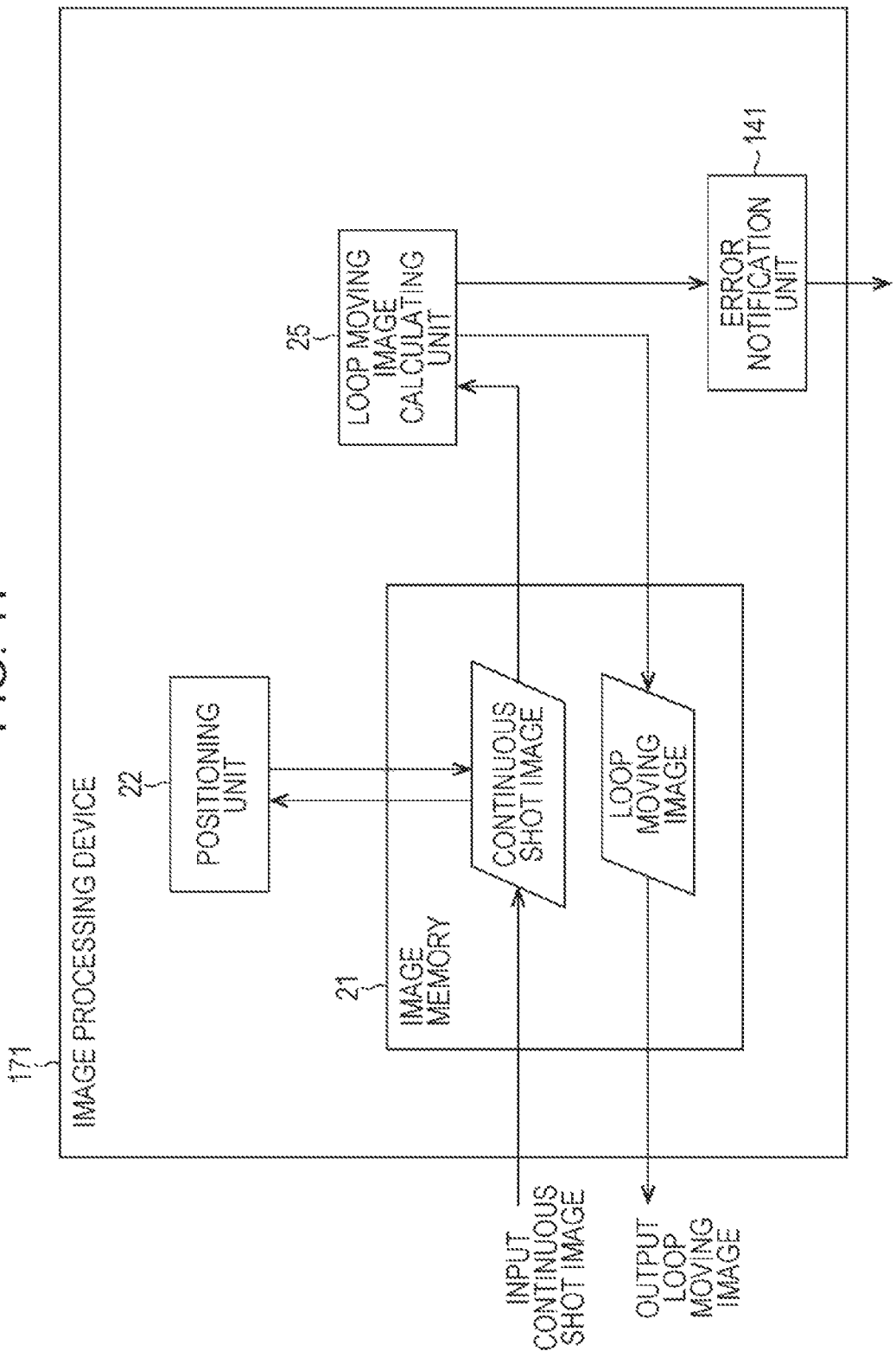
FIG. 11 is a diagram illustrating another configuration example of an image processing unit.

In such a case, the image processing unit realized by the CPU 91 and DSP 97 of the camera apparatus 81 executing a program is of the configuration shown in FIG. 11, for example. Note that in FIG. 11, portions corresponding to the case in FIG. 8 are denoted with the same reference numerals, and description thereof will be omitted as appropriate.

An image processing unit 171 is configured of the image memory 21, positioning unit 22, loop moving image calculating unit 25, and error notifying unit 141.

Recorded in the image memory 21 are continuous shot images imaged by the camera apparatus 81, and a loop moving image generated by the loop moving image calculating unit 25. The loop moving image calculating unit 25 generates a loop moving image from the continuous shot images supplied from the image memory 21.

[Description of Loop Moving Image Generating Processing]

Figure 12:
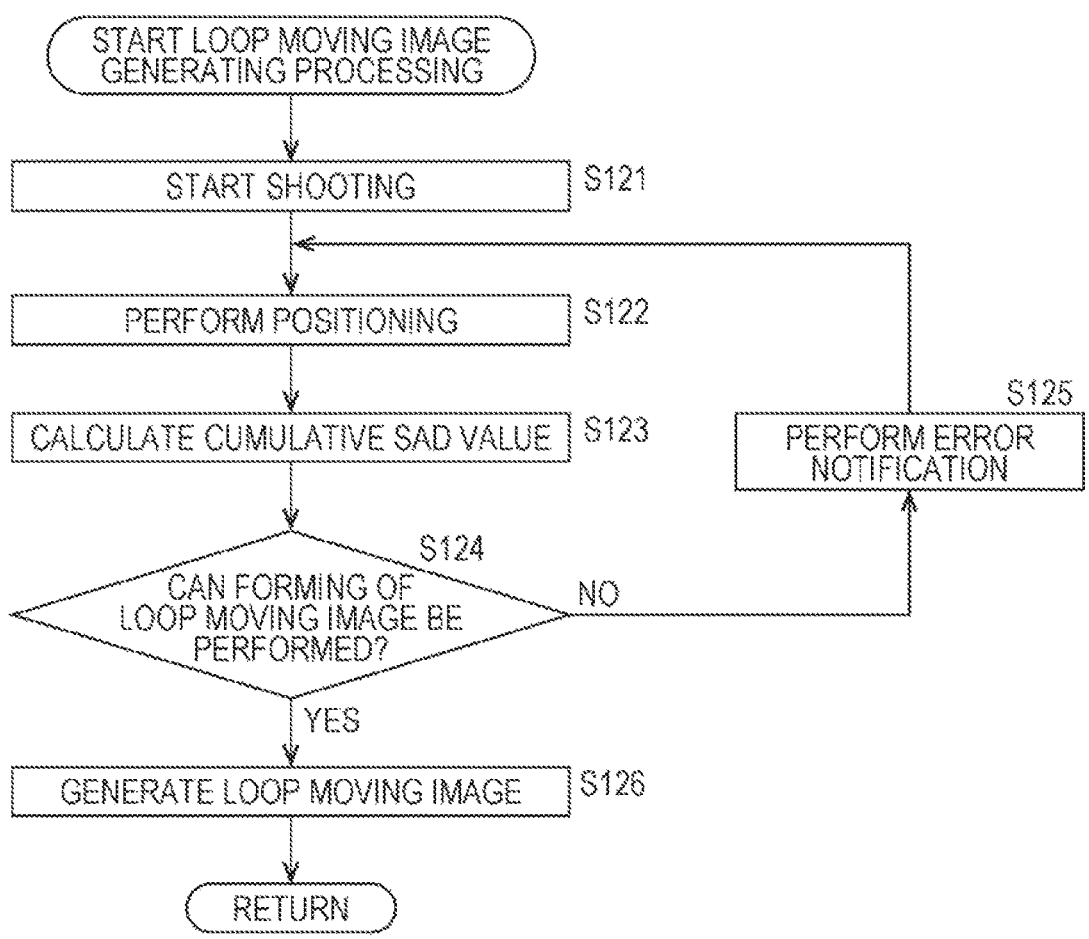
FIG. 12 is a flowchart for describing loop moving image generating processing.

Next, the processing performed in the case that the image processing unit is configured as shown in FIG. 11, with reference to the flowchart in FIG. 12. In this case, shooting processing described with reference to the flowchart in FIG. 9 is performed by the camera apparatus 81. Note however, in this case, in the processing of step S53, a loop moving image is generated without the continuous shot images being divided into segments.

The following is a description of the loop moving image generating processing corresponding to the processing in step S53 that is performed in the event that a loop moving image is generated without the continuous shot images being divided into segments, with reference to the flowchart in FIG. 12.

In step S121, the camera apparatus 81 starts shooting. That is to say, the imaging device 93 follows the instructions of the CPU 91 to perform photoelectric conversion of incident light from the lens 101, and supplies the continuous shot images obtained as the result thereof to the display unit 103 and image memory 21. Continuous shot images of each frame are shot at predetermined time intervals at the imaging device 93.

Figure 10:
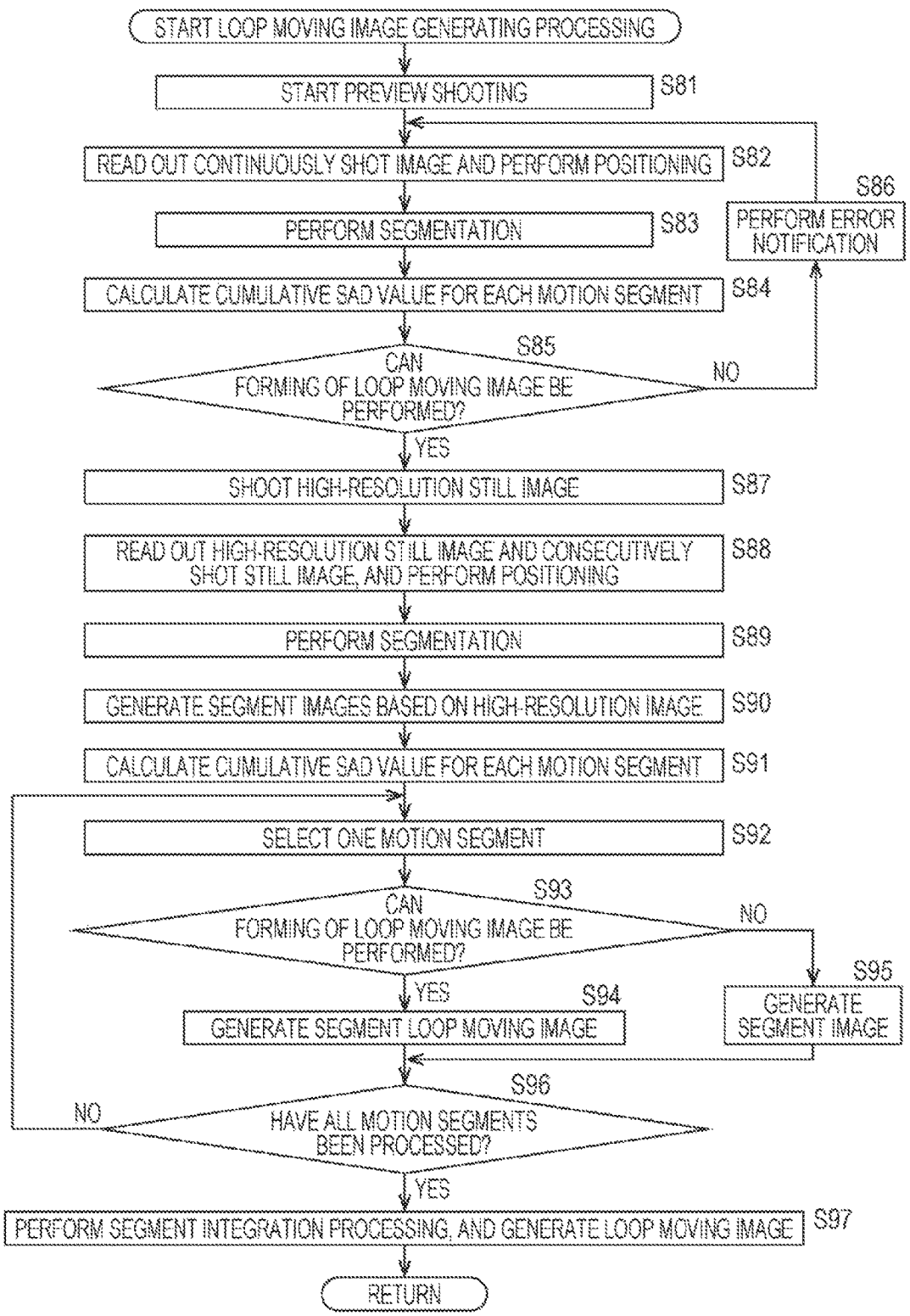
FIG. 10 is a flowchart for describing loop moving image generating processing.

In step S122, the positioning unit 22 reads out the continuous shot images from the image memory 21 and performs positioning processing, and supplies the positioned continuous shot images to the image memory 21 so as to be recorded. In step S122, processing the same as with that in step S82 in FIG. 10. The continuous shot images subjected to positioning are recorded in the image memory 21, and then supplied to the loop moving image calculating unit 25.

In step S123, the loop moving image calculating unit 25 calculates a cumulative SAD value for the continuous shot images, based on the continuous shot images from the image memory 21.

For example, the loop moving image calculating unit 25 takes, of the frames of the multiple continuous shot images, two arbitrary frames distanced by a number of frames indicated by the shortest cycle length Lmin or more, as frames to be processed. The loop moving image calculating unit 25 then obtains a cumulative SAD value regarding the section of consecutive frames indicated by the cumulative tap length Lsad, centered on the selected frames to be processed. Note that at the time of calculating the cumulative SAD value, the pixels of the entire continuous shot images are used to calculate the sum of absolute difference.

The loop moving image calculating unit 25 changes the pairs of frames to be processed while calculating the cumulative SAD value for each pair of frames, and takes the smallest value of the calculated cumulative SAD value to be the cumulative SAD value of the continuous shot images. The loop moving image calculating unit 25 supplies the cumulative SAD value thus obtained to the error notifying unit 141.

In step S124, the error notifying unit 141 determines whether or not a loop moving image can be formed of the continuous shot images, based on the cumulative SAD values of the continuous shot images supplied from the loop moving image calculating unit 25. For example, in the event that the smallest cumulative SAD value of the cumulative SAD values of the motion segments is within a predetermined threshold determined beforehand, the error notifying unit 141 determines that a loop moving image can be formed.

In the event that determination is made in step S124 that a loop moving image cannot be formed, in step S125 the error notifying unit 141 performs error notification. For example, the error notifying unit 141 supplies information to the effect that a loop moving image cannot be formed of the continuous shot images, to the display unit 103 to be displayed.

In the event that error notification is made, the processing then returns from step S125 to step S122, and the above-described processing is repeated. That is to say, determination is made based on multiple frames of continuous shot images that have been newly shot regarding whether or not a loop moving image can be formed of the continuous shot images.

Also, in the event that determination is made in step S124 that a loop moving image can be formed, in step S126 the loop moving image calculating unit 25 generates a segment loop moving image of the continuous shot images, based on the continuous shot images.

For example, with a pair of frames where the cumulative SAD value calculated in step S123 is the smallest as frames to be processed, the loop moving image calculating unit 25 extracts the continuous shot images of a section where these two frames are the starting edge and ending edge thereof. The loop moving image calculating unit 25 then generates a loop moving image by performing the above-described cross-fading processing, processing according to the graph cut method, random dissolve, and so forth, to generate a loop moving image, which is supplied to the image memory 21.

The loop moving image obtained in this way is a loop moving image obtained by the entire continuous shot images being looped without the continuous shot images being divided into segments. Upon generating a loop moving image, the loop moving image calculating unit 25 supplies the generated loop moving image to the image memory 21 so as to be recorded. The loop moving image generating processing then ends, following which the processing returns to step S53 in FIG. 9, and the shooting processing also ends.

Thus, in the event that the continuous shot images are not suitable for forming a loop moving image, the camera apparatus 81 makes a presentation to the user to the effect that a loop moving image cannot be formed. Accordingly, the user can immediately redo the shooting. Accordingly, the user can suitably shoot a loop moving image, and can obtain a high-quality loop moving image more easily.

Also, an arrangement may be made wherein determination is made regarding whether or not a loop moving image can be formed of the continuous shot images, at the time of shooting the continuous shot images, even in a case of generating a loop moving image from segment images and segment loop moving images of the segment using only the continuous shot images, as described with reference to the flowchart in FIG. 5. In such a case as well, determination results of whether or not a loop moving image can be formed of the continuous shot images are output as appropriate.

The above-described series of processing can be carried out by hardware or can be carried out by software. In the event of carrying out the series of processing by software, a program making up that software is installed from a program recording medium to a computer built into dedicated hardware, or into a general-purpose personal computer capable of executing various types of functions by various types of programs being installed thereto.

Figure 13:
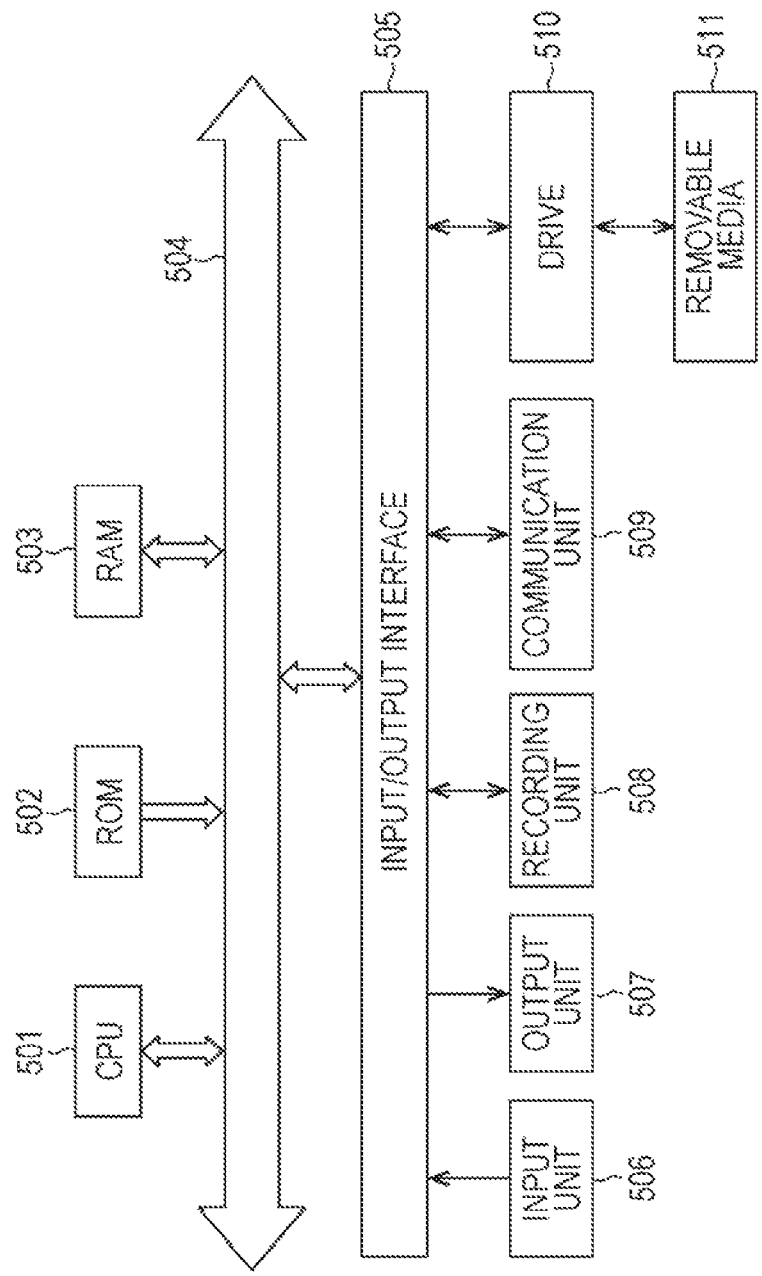
FIG. 13 is a diagram illustrating a configuration example of a computer.

FIG. 13 is a block diagram illustrating a configuration example of the hardware of a computer executing the above-described series of processing according to a program.

With the computer, a CPU 501, ROM (Read Only Memory) 502 and RAM (Random Access Memory) 503 are mutually connected by a bus 504.

An input/output interface 505 is further connected to the bus 504. Connected to the input/output interface 505 are an input unit 506 made up of a keyboard, mouse, microphone, and so forth, an output unit 507 made up of a display speaker, and so forth, a recording unit 508 made up of a hard disk or non-volatile memory or the like, a communication unit 509 made up of a network interface or the like, and a drive 510 for driving a removable media 511 such as a magnetic disk, optical disc, magneto-optical disc, or semiconductor memory or the like.

With a computer configured in this way, the CPU 501 loads a program recorded in the recoding unit 508 for example to the RAM 503 via the input/output interface 505 and bus 504, and executes the program, whereby the above-described series of processing is performed.

The program which the computer (CPU 501) executes is provided by being recorded in the removable media 511 which is packaged media such as a magnetic disk (including flexible disks), optical disc (CD-ROM (Compact Disc-Read Only Memory), DVD (Digital Versatile Disc), etc.) a magneto-optical disc, or semiconductor memory or the like, or by a cable or wireless transmission medium such as a local area network, the Internet, digital satellite broadcast, or the like, for example.

By mounting the removable media 511 to the drive 510, the program can be installed in the recording unit 508 via the input/output interface 505. Also, the program can be received by the communication unit 509 via a cable or wireless transmission medium and installed in the recording unit 508. Alternatively, the program can be installed in the ROM 502 or recording unit 508 beforehand.

Note that the program to be executed by the computer may be a program where processing is performed in time sequence following the order described in the Specification, or may be a program where processing is performed in parallel or at necessary timings such as when call-up is performed.

Also, the embodiments of the present technology are not restricted to the above-described embodiments, and various modifications may be made thereto without departing from the essence of the present technology.

REFERENCE SIGNS LIST 11 image processing device
22 positioning unit
23 segment calculating unit
24 3-dimensional NR unit
25 loop moving image calculating unit
26 segment processing integration unit
81 camera apparatus
99 mode dial
141 error notifying unit

The invention claimed is:

1. An image processing device, comprising:
    a loop moving image generator configured to:
        clip out a subject with motion from a plurality of shot images shot at different points in time to generate a motion segment, wherein the motion segment includes the subject with motion;

detect a first image and a second image, of a plurality of continuous images of a plurality of the motion segments, having a degree of similarity that is highest,
  wherein the degree of similarity is calculated based on a sum of absolute difference of pixels, of the first image and the second image, that corresponds to a sum of absolute values of difference in a luminance value for each of the pixels at same position in the first image and the second image; and
generate, from the plurality of shot images, a plurality of first images playable as a loop moving image, based on the detected first image and the second image, the motion segment, and at least a still segment,
  wherein the motion segment and the still segment are obtained from the plurality of shot images in a spatial direction.

2. The image processing device according to claim 1, wherein, of the plurality of continuous images, the loop moving image is repeatedly displayed in a first order between the first image and the second image of the plurality of first images.

3. The image processing device according to claim 2, wherein the loop moving image generator is further configured to generate a segment map to identify a position of each of the plurality of the motion segments or a plurality of the still segments present on the plurality of shot images.

4. The image processing device according to claim 1, wherein the loop moving image generator is further configured to generate a still segment image which is a still image based on a plurality of the still segments.

5. The image processing device according to claim 4, wherein the loop moving image generator is further configured to integrate the plurality of first images playable as the loop moving image and the still segment image.

6. The image processing device according to claim 1, wherein the loop moving image generator is further configured to generate the still segment, based on an average image of a plurality of images of the still segments in the plurality of shot images.

7. The image processing device according to claim 1, wherein the loop moving image generator is further configured to position the plurality of shot images to rectify shake in the plurality of shot images due to motion of an image capturing device at a time of capture of the plurality of shot images.

8. The image processing device according to claim 1, wherein the loop moving image generator is further configured to generate a still segment image from one image of the plurality of continuous images of the plurality of the motion segments, based on a lack of two images with the degree of similarity in the plurality of continuous images.

9. The image processing device according to claim 1, further comprising:
  a selector configured to switch between a plurality of shooting modes;
  wherein, based on a selection of a first mode from the plurality of shooting modes by the selector, the plurality of shot images and a high-resolution image are shot.

10. The image processing device according to claim 9, wherein the plurality of shot images are shot before the high-resolution image is shot.

11. The image processing device according to claim 10, wherein, based on the detection of the first image and the second image, the high-resolution image is shot and the loop moving image is generated.

12. An image processing method, comprising:
clipping out a subject with motion from a plurality of shot images shot at different points in time to generate a motion segment, wherein the motion segment includes the subject with motion;
detecting a first image and a second image, of a plurality of continuous images of a plurality of the motion segments, having a degree of similarity that is highest,
  wherein the degree of similarity is calculated based on a sum of absolute difference of pixels, of the first image and the second image, that corresponds to a sum of absolute values of difference in a luminance value for each of the pixels at same position in the first image and the second image; and
generating, from the plurality of shot images, a plurality of first images playable as a loop moving image, based on the detected first image and the second image, the motion segment, and at least a still segment,
  wherein the motion segment and the still segment are obtained from the plurality of shot images in a spatial direction.

13. A non-transitory computer-readable medium having stored thereon computer-executable instructions that, when executed by a processor of a computer, cause the processor to execute operations, the operations comprising:
clipping out a subject with motion from a plurality of shot images shot at different points in time to generate a motion segment, wherein the motion segment includes the subject with motion;
detecting a first image and a second image, of a plurality of continuous images of a plurality of the motion segments, having a degree of similarity that is highest,
  wherein the degree of similarity is calculated based on a sum of absolute difference of pixels, of the first image and the second image, that corresponds to a sum of absolute values of difference in a luminance value for each of the pixels at same position in the first image and the second image; and
generating, from the plurality of shot images, a plurality of first images playable as a loop moving image, based on the detected first image and the second image, the motion segment, and at least a still segment,
  wherein the motion segment and the still segment are obtained from the plurality of shot images in a spatial direction.

* * * * *